United States Patent
Chiang et al.

(10) Patent No.: US 10,230,128 B2
(45) Date of Patent: *Mar. 12, 2019

(54) DAMAGE TOLERANT BATTERIES

(71) Applicant: 24M Technologies, Inc., Cambridge, MA (US)

(72) Inventors: Yet-Ming Chiang, Weston, MA (US); Taison Tan, Cambridge, MA (US); Jeffry Disko, North Brookfield, MA (US); Richard Holman, Wellesley, MA (US); Mihai Duduta, Somerville, MA (US)

(73) Assignee: 24M Technologies, Inc., Cambridge, MA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/682,417

(22) Filed: Apr. 9, 2015

(65) Prior Publication Data

US 2015/0295272 A1 Oct. 15, 2015

Related U.S. Application Data

(60) Provisional application No. 61/977,339, filed on Apr. 9, 2014.

(51) Int. Cl.
*H01M 10/00* (2006.01)
*H01M 10/04* (2006.01)
*H01M 2/34* (2006.01)
*H01M 4/02* (2006.01)

(52) U.S. Cl.
CPC ....... *H01M 10/0436* (2013.01); *H01M 2/345* (2013.01); *H01M 2/347* (2013.01); *H01M 2/348* (2013.01); *H01M 4/02* (2013.01); *H01M 2004/025* (2013.01)

(58) Field of Classification Search
CPC ... H01M 2/345; H01M 2/348; H01M 10/0436
See application file for complete search history.

(56) References Cited

U.S. PATENT DOCUMENTS

| | | | |
|---|---|---|---|
| 8,722,226 B2 | 5/2014 | Chiang et al. | |
| 8,722,227 B2 | 5/2014 | Chiang et al. | |
| 8,778,552 B2 | 7/2014 | Chiang et al. | |

(Continued)

*Primary Examiner* — Nicholas P D'Aniello
(74) *Attorney, Agent, or Firm* — Cooley LLP

(57) ABSTRACT

Embodiments described herein relate generally to electrochemical cells having semi-solid electrodes that have damage tolerance, and in particular, are tolerant to physical damage due to short circuit, crushing, or overheating. In some embodiments, an electrochemical cell includes a positive electrode, a negative electrode and an ion-permeable membrane separating the positive electrode and the negative electrode. At least one of the positive electrode and the negative electrode can include a semi-solid ion-storing redox composition which has a thickness of at least about 250 μm. The electrochemical cell can have a first operating voltage in a first planar configuration and a second operating voltage in a second non-planar configuration such that the first operating voltage and the second operating voltage are substantially similar. In some embodiments, the electrochemical cell has a bend axis such that the electrochemical cell is bent about the bend axis in the second non-planar configuration.

21 Claims, 34 Drawing Sheets

(56) References Cited

U.S. PATENT DOCUMENTS

| | | |
|---|---|---|
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,496,582 B1* | 11/2016 | Lim ............... H01M 10/0436 |
| 2010/0047671 A1 | 2/2010 | Chiang et al. |
| 2010/0323264 A1 | 12/2010 | Chiang et al. |
| 2011/0117417 A1* | 5/2011 | Pitts ............... H01M 4/0438 429/149 |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |

\* cited by examiner

DAMAGE TOLERANT BATTERIES

CROSS-REFERENCE TO RELATED APPLICATIONS

This application claims priority to and the benefit of U.S. Provisional Patent Application Ser. No. 61/977,339, filed Apr. 9, 2014 and titled "Damage Tolerant Batteries," the disclosure of which is hereby incorporated by reference in its entirety.

BACKGROUND

Embodiments described herein relate generally to electrochemical cells having semi-solid electrodes that have damage tolerance such that the electrochemical cells can be subjected to mechanical or thermal damage without substantial degradation in electronic performance and/or experiencing thermal runaway.

Batteries are typically constructed of solid electrodes, separators, electrolyte, and ancillary components such as, for example, packaging, thermal management, cell balancing, consolidation of electrical current carriers into terminals, and/or other such components. The electrodes typically include active materials, conductive materials, binders and other additives.

Some known methods for preparing batteries include coating a metallic substrate (e.g., a current collector) with slurry composed of an active material, a conductive additive, and a binding agent dissolved or dispersed in a solvent, evaporating the solvent, and calendering the dried solid matrix to a specified thickness. The electrodes are then cut, packaged with other components, infiltrated with electrolyte and the entire package is then sealed.

Such known methods generally involve complicated and expensive manufacturing steps such as casting the electrode and are only suitable for electrodes of limited thickness, for example, less than 100 μm (final single sided coated thickness). These known methods for producing electrodes of limited thickness result in batteries with lower capacity, lower energy density and a high ratio of inactive components to active materials. Furthermore, the binders used in known electrode formulations can increase tortuosity and decrease the ionic conductivity of the electrode.

Damage to conventional li-ion batteries, for example, li-ion batteries that include conventional electrodes, can negatively impact the electronic performance of the battery and in some instances, can even cause catastrophic failure. Damage can include mechanical damage, for example, bending, crushing, impact, shock, vibration, or penetration, or thermal damage, for example exposure to high or low temperatures or excessive temperature cycling. Such damage can affect the electronic performance of the battery, for example, increase impedance, reduce energy density and/or charge capacity of the battery. In some cases, such damage can cause over heating of the battery and/or short circuit (e.g., internal or external short circuit) which can lead to accelerated release of gases, and drying out of the electrolyte. Heat generated can be greater than the heat dissipated by the battery which can eventually lead to excessive heat build up in the battery. This is called thermal runaway which, in some cases, can cause the battery to explode or catch fire. In some cases, physical damage can cause the liquid electrolyte in the battery to leak out and burn causing the battery to catch fire or explode.

Physical damage is of particular concern for hybrid and plug-in electric vehicle manufacturers that use li-ion battery packs as the primary or secondary power source. If such a vehicle is involved in an accident, the li-ion cells within the battery pack, for example li-ion cells formed from conventional electrodes, can be damaged and undergo catastrophic failure. In 2011, the Chevy Volt plug-in hybrid became a target of an investigation by the National Highway Traffic Safety Administration (NHTSA) because the battery pack included in the Chevy Volt caught fire when subjected to a crash test. This clearly underscores the need for new li-ion battery technologies which are damage tolerant.

Thus, it is an enduring goal of energy storage systems development to develop new electrochemical batteries and electrodes that have longer cycle life, increased energy density, charge capacity and overall performance, and are relatively safe when subjected to mechanical or thermal damage.

SUMMARY

Embodiments described herein relate generally to electrochemical cells having semi-solid electrodes that have damage tolerance such that the electrochemical cells can be subjected to mechanical or thermal damage without substantial degradation in electronic performance and/or experiencing thermal runaway. In some embodiments, an electrochemical cell includes a positive electrode, a negative electrode and an ion-permeable membrane separating the positive electrode and the negative electrode. At least one of the positive electrode and the negative electrode can include a semi-solid ion-storing redox composition which has a thickness of at least about 250 μm. The electrochemical cell can have a first operating voltage in a first planar configuration and a second operating voltage in a second non-planar configuration such that the first operating voltage and the second operating voltage are substantially similar. In some embodiments, the electrochemical cell has a bend axis such that the electrochemical cell is bent about the bend axis in the second non-planar configuration.

DETAILED DESCRIPTION

Figure 1:
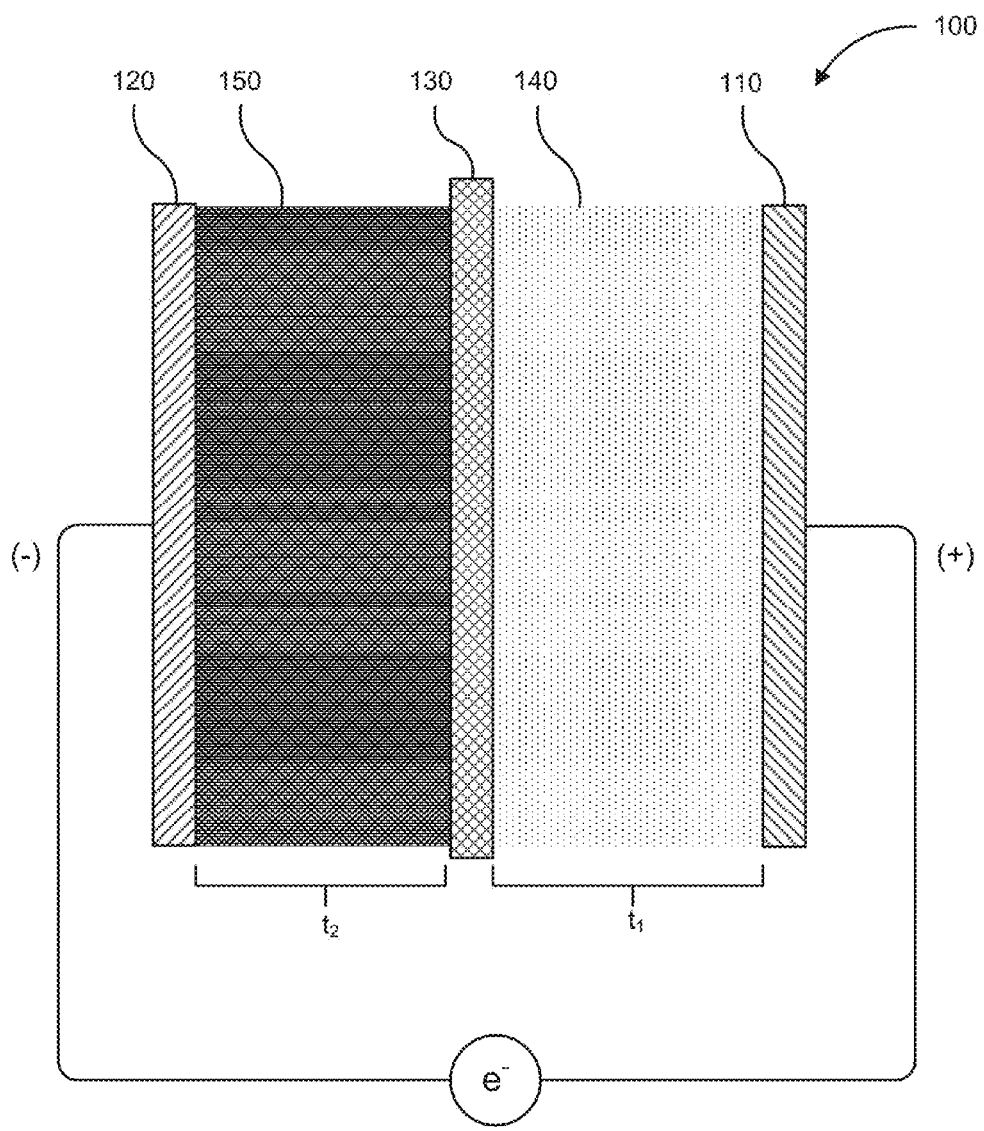
FIG. 1 is a schematic illustration of an electrochemical cell according to an embodiment.

Consumer electronic batteries have gradually increased in energy density with the progress of lithium-ion battery technology. The stored energy or charge capacity of a manufactured battery is a function of: (1) the inherent charge capacity of the active material (mAh/g), (2) the volume of the electrodes ($cm^3$) (i.e., the product of the electrode thickness, electrode area, and number of layers (stacks)), and (3) the loading of active material in the electrode media (e.g., grams of active material per $cm^3$ of electrode media). Therefore, to enhance commercial appeal (e.g., increased energy density and decreased cost), it is generally desirable to increase the areal charge capacity ($mAh/cm^2$). The areal charge capacity can be increased, for example, by utilizing active materials that have a higher inherent charge capacity, increasing relative percentage of active charge storing material (i.e., "loading") in the overall electrode formulation, and/or increasing the relative percentage of electrode material used in any given battery form factor. Said another way, increasing the ratio of active charge storing components (e.g., the electrodes) to inactive components (e.g., the separators and current collectors), increases the overall energy density of the battery by eliminating or reducing components that are not contributing to the overall performance of the battery. One way to accomplish increasing the areal charge capacity, and therefore reducing the relative percentage of inactive components, is by increasing the thickness of the electrodes.

Semi-solid electrodes described herein can be made: (i) thicker (e.g., greater than 250 μm—up to 2,000 μm or even greater) due to the reduced tortuosity and higher electronic conductivity of the semi-solid electrode, (ii) with higher loadings of active materials, and (iii) with a simplified manufacturing process utilizing less equipment. These semi-solid electrodes can be formed in fixed or flowable configurations and decrease the volume, mass and cost contributions of inactive components with respect to active components, thereby enhancing the commercial appeal of batteries made with the semi-solid electrodes. In some embodiments, the semi-solid electrodes described herein are binderless and/or do not use binders that are used in conventional battery manufacturing. Instead, the volume of the electrode normally occupied by binders in conventional electrodes, is now occupied by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes.

Since the semi-solid electrodes described herein, can be made substantially thicker than conventional electrodes, the ratio of active materials (i.e., the semi-solid cathode and/or anode) to inactive materials (i.e. the current collector and separator) can be much higher in a battery formed from electrochemical cell stacks that include semi-solid electrodes relative to a similar battery formed from electrochemical cell stacks that include conventional electrodes. This substantially increases the overall charge capacity and energy density of a battery that includes the semi-solid electrodes described herein. Examples of electrochemical cells utilizing thick semi-solid electrodes and various formulations thereof are described in U.S. Pat. No. 8,993,159 (also referred to as "the '159 Patent"), issued Mar. 31, 2015, entitled "Semi-Solid Electrodes Having High Rate Capability," U.S. Patent Application Publication No. 2004/0315097 (also referred to as "the '097 Publication), published Oct. 23, 2014, entitled "Asymmetric Battery Having a Semi-Solid Cathode and High Energy Density Anode," and U.S. Patent Application Publication No. 2015/0024279 (also referred to as "the '279 Publication") published Jan. 22, 2015, entitled "Semi-Solid Electrodes with Gel Polymer Additive", the entire disclosures of which are hereby incorporated by reference.

Known electrochemical cells, for example, electrochemical cells that include conventional electrodes can experience degradation in electronic performance when damaged. Damage can include mechanical damage, for example, bending, crushing, shock, impact, vibrations or penetration, and thermal damage, for example, heating or cooling to temperatures beyond the advised operating temperatures of the electrochemical cells. Without being bound by any particular theory, mechanical and/or thermal damage can lead to physical damage, for example, to the electrodes, the separator, and/or current collector, heat build up, electrolyte evaporation and/or gas generation. Such damage can degrade the electronic performance, for example, conductivity (impedance), charge capacity, and/or current density. In some known cases, such damage can cause an external or internal short circuit, or thermal runaway which can cause the electrochemical cell to experience catastrophic failure, for example, complete electronic failure, catch fire or explode.

Embodiments of semi-solid electrodes described herein and electrochemical cells formed therefrom are damage tolerant, such that the electrochemical cells can be subjected to mechanical or thermal abuse without undergoing mechanical, electrical, or thermal failure. Electrochemical cells that include the damage tolerant semi-solid electrodes described herein provide several advantages including; (1) the electrochemical cells can be bent or curved any number of times from a planar configuration into any non-planar configuration (e.g., a 3-dimensional curved shape) without causing the electrochemical cell to experience any significant change in an operating voltage of the electrochemical cell; (2) can be flexibly disposed in a system or device of any shape, for example, dome shaped; (3) mechanical abuse, for example, crushing, impact, piercing, or vibrations have no substantial effect on the open-circuit potential of the electrochemical cell or temperature of the battery; (4) the electrochemical cell can be heated to a temperature of greater than about 140 degrees Celsius without experiencing thermal runaway; and (5) external short circuit does not result in the cell venting or loosing vacuum.

Without being bound by any particular theory, the semi-solid electrodes described herein maintain a certain amount of "fluidity" even after casting on the current collectors. The semi-solid electrodes can thereby, absorb a significant amount of mechanical abuse by flowing around the region where the impact occurs. The fluidity of the semi-solid electrode can also provide self healing characteristics to the electrodes. In other words, any voids or cracks formed in the semi-solid electrode due to mechanical damage can possibly be filled by the semi-solid electrode slurry from undamaged regions of the electrode such that there is no substantial impact on the electronic performance, for example, conductivity/impedance, energy density or charge capacity of the electrode.

In some embodiments, an electrochemical cell includes a positive electrode, a negative electrode and an ion-permeable membrane separating the positive electrode and the negative electrode. At least one of the positive electrode and the negative electrode includes a semi-solid ion-storing redox composition which has a thickness of at least about 250 µm. The electrochemical cell can have a first operating voltage in a first planar configuration and a second operating voltage in a second non-planar configuration such that the first operating voltage and the second operating voltage are substantially similar or substantially the same. In some embodiments, the semi-solid ion-storing redox composition remains substantially insoluble during operation of the electrochemical cell. In some embodiments, the electrochemical cell has a bend axis such that the electrochemical cell is bent about the bend axis in the second non-planar configuration.

In some embodiments, an electrochemical cell includes a positive electrode, a negative electrode, and an ion-permeable membrane separating the positive electrode and the negative electrode. At least one of the positive electrode and the negative electrode includes a semi-solid ion-storing redox composition, which has a thickness of at least about 250 µm. The electrochemical cell has an open-circuit voltage which is substantially unchanged even after the thickness of the semi-solid electrode is reduced by about 50%. In some embodiments, the thickness of the electrochemical cell is reduced by crushing between a flat platen and a textured platen. In some embodiments, the temperature of the electrochemical cell is substantially unchanged after the thickness of the semi-solid electrode is reduced by about 50%.

In some embodiments, an electrochemical cell includes a positive electrode, a negative electrode, and an ion-permeable membrane separating the positive electrode and the negative electrode. At least one of the positive electrode and the negative electrode includes a semi-solid ion storing redox composition which has a thickness of at least about 250 µm. The electrochemical cell is configured to absorb a mechanical force by deforming from a first configuration to a second configuration without mechanical, electrical or thermal failure.

In some embodiments, an electrochemical cell includes a positive electrode, a negative electrode, and an ion-permeable membrane separating the positive electrode and the negative electrode. At least one of the positive electrode and the negative electrode is a semi-solid electrode that includes a suspension of an ion-storing redox composition in a non-aqueous liquid electrolyte, and has a thickness of at least about 250 µm. The electrochemical cell is configured to withstand a stress event without experiencing thermal runaway. The stress event comprises at least one of: (1) deformation of the cell (e.g., physical deformation, such as bending, crushing, etc.); (2) heating to a temperature of greater than about 140 degrees Celsius; (3) external short-circuiting; (4) internal short-circuiting; and (5) penetration.

In some embodiments, an electrochemical cell includes a positive electrode, a negative electrode, and an ion-permeable membrane separating the positive electrode and the negative electrode. At least one of the positive electrode and the negative electrode includes an ion-storing redox composition and has a thickness of at least about 250 µm. The electrochemical cell is configured to supply a current, when externally short circuited, of not more than about 50 C or not more than about 30 C (i.e., a "charge rate" or "C-rate" of not more than about 50 C or not more than about 30 C).

In some embodiments, an electrochemical cell includes a positive electrode, a negative electrode, and an ion-permeable membrane separating the positive electrode and the negative electrode. At least one of the positive electrode and the negative electrode includes a semi-solid electrode which has a thickness of at least about 250 µm such that the electrochemical cell does not experience thermal runaway even after the electrochemical cell is heated to a temperature of greater than about 140 degrees Celsius. In some embodiments, the electrochemical cell does not experience thermal runaway even after heating to a temperature of greater than about 150 degrees Celsius.

In some embodiments, semi-solid electrode compositions (also referred to herein as "semi-solid suspension" and/or "slurry") described herein can be mixed in a batch process e.g., with a batch mixer that can include, for example, a high shear mixture, a planetary mixture, a centrifugal planetary mixture, a sigma mixture, a CAM mixture, and/or a roller mixture, with a specific spatial and/or temporal ordering of component addition. In some embodiments, slurry components can be mixed in a continuous process (e.g. in an extruder), with a specific spatial and/or temporal ordering of component addition.

The mixing and forming of a semi-solid electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

In some embodiments, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent shear rate of 1,000 $s^{-1}$. In some embodiments, the process conditions can be selected to produce a prepared slurry having two or more properties as described herein. Examples of systems and methods that can be used for preparing the semi-solid electrode compositions described herein are described in U.S. Patent Application Publication No. 2013/0337319 (also referred to as "the '319 Publication"), filed Mar. 15, 2013, entitled "Electrochemical Slurry Compositions and Methods for Preparing the Same," the entire disclosure of which is hereby incorporated by reference.

As used herein, the term "about" and "approximately" generally mean plus or minus 10% of the value stated, e.g., about 250 µm would include 225 µm to 275 µm, about 1,000 µm would include 900 µm to 1,100 µm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles and through the thickness and length of the electrode. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 shows a schematic illustration of an electrochemical cell 100. The electrochemical cell 100 includes a positive current collector 110, a negative current collector 120 and a separator 130 disposed between the positive current collector 110 and the negative current collector 120. The positive current collector 110 is spaced from the separator 130 by a first distance $t_1$ and at least partially defines a positive electroactive zone. The negative current collector 120 is spaced from the separator 130 by a second distance $t_2$ and at least partially defines a negative electroactive zone. A semi-solid cathode 140 (the negative electrode) is disposed in the positive electroactive zone and an anode 150 (the positive electrode), which can be a semi-solid anode 150, is disposed in the negative electroactive zone. The semi-solid cathode 140 and/or the semi-solid anode 150 include a semi-solid ion-storing redox composition. In some embodiments, the thickness of the positive electroactive zone defined by the distance $t_1$ and/or the thickness of the negative electroactive zone defined by the distance $t_2$ can be at least about 250 µm, for example in the range of about 250 µm to about 2,000 µm.

The semi-solid cathode 140 and/or anode 150 (e.g., semi-solid anode) can be disposed on a current collector, for example, coated, casted, drop coated, pressed, roll pressed, or deposited using any other suitable method. The semi-solid cathode 140 can be disposed on the positive current collector 110 and the anode 150 can be disposed on the negative current collector 120. For example the semi-solid cathode 140 and/or anode 150 (e.g., semi solid anode) can be coated, casted, calendered and/or pressed on the positive current collector 110 and the negative current collector 120, respectively. The positive current collector 110 and the negative current collector 120 can be any current collectors that are electronically conductive and are electrochemically inactive under the operating conditions of the cell. Typical current collectors for lithium cells include copper, aluminum, or titanium for the negative current collector 120 and aluminum for the positive current collector 110, in the form of sheets or mesh, or any combination thereof. Current collector materials can be selected to be stable at the operating potentials of the semi-solid cathode 140 and the anode 150 (e.g., semi-solid anode) of the electrochemical cell 100. For example, in non-aqueous lithium systems, the positive current collector 110 can include aluminum, or aluminum coated with conductive material that does not electrochemically dissolve at operating potentials of 2.5-5.0V with respect to Li/Li$^+$. Such materials include platinum, gold, nickel, conductive metal oxides such as vanadium oxide, and carbon. The negative current collector 120 can include copper or other metals that do not form alloys or intermetallic compounds with lithium, carbon, and/or coatings comprising such materials disposed on another conductor.

The semi-solid cathode 140 and the anode 150 (e.g., semi-solid anode) included in the electrochemical cell 100 are separated by a separator 130. The separator 130 can be any conventional membrane that is capable of ion transport, i.e., an ion-permeable membrane. In some embodiments, the separator 130 is a liquid impermeable membrane that permits the transport of ions therethrough, namely a solid or gel ionic conductor. In some embodiments the separator 130 is a porous polymer membrane infused with a liquid electrolyte that allows for the shuttling of ions between the semi-solid cathode 140 and the semi-solid anode 150 electroactive materials, while preventing the transfer of electrons. In some embodiments, the separator 130 is a microporous membrane that prevents particles forming the positive and negative electrode compositions from crossing the membrane. In some embodiments, the separator 130 is a single or multilayer microporous separator, optionally with the ability to fuse or "shut down" above a certain temperature so that it no longer transmits working ions, of the type used in the lithium ion battery industry and well-known to those skilled in the art. In some embodiments, the separator 130 can include a polyethyleneoxide (PEO) polymer in which a lithium salt is complexed to provide lithium conductivity, or Nafion™ membranes which are proton conductors. For example, PEO based electrolytes can be used as the separator 130, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

The semi-solid cathode 140 can include an ion-storing solid phase material which can include, for example, an active material and/or a conductive material. The quantity of the ion-storing solid phase material can be in the range of about 0% to about 80% by volume. The cathode 140 can include an active material such as, for example, a lithium bearing compound (e.g., Lithium Iron Phosphate (LFP), $LiCoO_2$, $LiCoO_2$ doped with Mg, $LiNiO_2$, $Li(Ni, Co, Al)O_2$ (known as "NCA"), $Li(Ni, Mn, Co)O_2$ (known as "NMC"), $LiMn_2O_4$ and its derivatives, etc.). The cathode 140 can also include a conductive material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls," graphene sheets and/or aggregate of graphene sheets, any other conductive material, alloys or combination thereof. The cathode 140 can also include a non-aqueous liquid electrolyte such as, for example, ethylene carbonate, dimethyl carbonate, diethyl carbonate, SSDE, or any other electrolyte described herein or combination thereof.

In some embodiments, the semi-solid anode 150 can also include an ion-storing solid phase material which can include, for example, an active material and/or a conductive material. The quantity of the ion-storing solid phase material can be in the range of about 0% to about 80% by volume. The anode 150 can include an anode active material such as, for example, lithium metal, carbon, lithium-intercalated carbon, lithium nitrides, lithium alloys and lithium alloy forming compounds of silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide, any other materials or alloys thereof, and any other combination thereof.

The anode 150 (e.g., a semi-solid anode) can also include a conductive material which can be a carbonaceous material such as, for example, graphite, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the anode 150 can also include a non-aqueous liquid electrolyte such as, for example, ethylene carbonate, dimethyl carbonate, diethyl carbonate, or any other electrolyte described herein or combination thereof.

In some embodiments, the semi-solid cathode 140 and/or the semi-solid anode 150 can include active materials and optionally conductive materials in particulate form suspended in a non-aqueous liquid electrolyte. In some embodiments, the semi-solid cathode 140 and/or the semi-solid anode 150 particles (e.g., cathodic or anodic particles) can have an effective diameter of at least about 1 µm. In some embodiments, the cathodic or anodic particles have an effective diameter between about 1 µm and about 10 µm. In some embodiments, the cathodic or anodic particles have an effective diameter of at least about 10 µm or more. In some embodiments, the cathodic or anodic particles have an effective diameter of less than about 1 µm. In some embodiments, the cathodic or anodic particles have an effective diameter of less than about 0.5 µm. In some embodiments, the cathodic or anodic particles have an effective diameter of less than about 0.25 µm. In some embodiments, the cathodic or anodic particles have an effective diameter of less than about 0.1 µm. In some embodiments, the cathodic or anodic particles have an effective diameter of less than about 0.05 µm. In other embodiments, the cathodic or anodic particles have an effective diameter of less than about 0.01 µm.

In some embodiments, the semi-solid cathode 140 can include about 20% to about 80% by volume of an active material. In some embodiments, the semi-solid cathode 140 can include about 40% to about 75% by volume, about 50% to about 75% by volume, about 60% to about 75% by volume, or about 60% to about 80% by volume of an active material.

In some embodiments, the semi-solid cathode 140 can include about 0% to about 25% by volume of a conductive material. In some embodiments, the semi-solid cathode 140 can include about 1.0% to about 6% by volume, about 6% to about 12%, or about 2% to about 15% by volume of a conductive material.

In some embodiments, the semi-solid cathode 140 can include about 20% to about 70% by volume of an electrolyte. In some embodiments, the semi-solid cathode 140 can include about 30% to about 60%, about 40% to about 50%, or about 20% to about 40% by volume of an electrolyte.

In some embodiments, the semi-solid anode 150 can include about 20% to about 80% by volume of an active material. In some embodiments, the semi-solid anode 150 can include about 40% to about 75% by volume, about 50% to about 75%, about 60% to about 75%, or about 60% to about 80% by volume of an active material.

In some embodiments, the semi-solid anode 150 can include about 0% to about 20% by volume of a conductive material. In some embodiments, the semi-solid anode 150 can include about 1% to about 10%, 1% to about 6%, about 0.5% to about 2% by volume, about 2% to about 6%, or about 2% to about 4% by volume of a conductive material.

In some embodiments, the semi-solid anode 150 can include about 20% to about 70% by volume of an electrolyte. In some embodiments, the semi-solid anode 150 can include about 30% to about 60%, about 40% to about 50%, or about 20% to about 40% by volume of an electrolyte.

Examples of active materials, conductive materials, and/or electrolytes that can be used in the semi-solid cathode 140 and/or the semi-solid anode 150 compositions, various formulations thereof, and electrochemical cells formed therefrom, are described in the '159 Patent, the '097 Publication, and the '279 Publication.

In some embodiments, the semi-solid anode 150 can also include about 1% to about 30% by volume of a high capacity material. Such high capacity materials can include, for example, silicon, bismuth, boron, gallium, indium, zinc, tin, antimony, aluminum, titanium oxide, molybdenum, germanium, manganese, niobium, vanadium, tantalum, iron, copper, gold, platinum, chromium, nickel, cobalt, zirconium, yttrium, molybdenum oxide, germanium oxide, silicon oxide, silicon carbide, any other high capacity materials or alloys thereof, and any combination thereof. In some embodiments, the semi-solid anode can include about 1% to about 5% by volume, about 1% to about 10% by volume, or about 1% to about 20% by volume of the high capacity material. Examples of high capacity materials that can be included in the semi-solid anode 150, various formulations thereof and electrochemical cells formed therefrom, are described in the '097 Publication.

In some embodiments, the electrolyte included in the at least one of the semi-solid cathode 140 and the semi-solid anode 150 can include about 0.1% to about 1% by weight of a gel-polymer additive. Examples of gel polymer additives that can be included in the semi-solid cathode 140 and/or semi-solid anode 150 formulation, and electrochemical cells therefrom are described in the '279 Publication.

In some embodiments, the cathode 140 and/or anode 150 semi-solid suspensions can initially be flowable, and can be caused to become non-flowable by "fixing". In some embodiments, fixing can be performed by the action of electrochemically cycling the battery. In some embodiments, electrochemical cycling is performed within the current, voltage, or temperature range over which the battery is subsequently used. In some embodiments, fixing is performed by electrochemical cycling of the battery to a higher or lower current, higher or lower voltage, or higher or lower temperature, that the range over which the battery is subsequently used. In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100 formed from the semi-solid cathode 140 and/or the semi-solid anode 150. In some embodiments, one or more additives are added to the semi-solid suspensions to facilitate fixing. In some embodiments, fixing can be performed by the action of photopolymerization. In some embodiments, fixing is performed by action of electromagnetic radiation with wavelengths that are transmitted by the unfilled positive and/or negative electroactive zones of the electrochemical cell 100 formed from a semi-solid cathode and/or semi-solid anode. In some embodiments, the semi-solid suspension can be fixed by heating. In some embodiments, one or more additives are added to the semi-solid suspensions to facilitate fixing.

In some embodiments, the injectable and flowable semi-solid cathode 140 and/or semi-solid anode 150 is caused to become non-flowable by "plasticizing". In some embodiments, the rheological properties of the injectable and flowable semi-solid suspension are modified by the addition of a thinner, a thickener, and/or a plasticizing agent. In some embodiments, these agents promote processability and help retain compositional uniformity of the semi-solid suspension under flowing conditions and positive and negative electroactive zone filling operations. In some embodiments, one or more additives are added to the flowable semi-solid suspension to adjust its flow properties to accommodate processing requirements.

Systems employing negative and/or positive ion-storage materials that are insoluble storage hosts for working ions, meaning that said materials can take up or release the working ion while all other constituents of the materials remain substantially insoluble in the electrolyte, are particularly advantageous as the electrolyte does not become contaminated with electrochemical composition products. In addition, systems employing negative and/or positive lithium ion-storage materials are particularly advantageous when using non-aqueous electrochemical compositions.

In some embodiments, the semi-solid ion-storing redox compositions include materials proven to work in conventional lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

In some embodiment, the cathode 140 can be a semi-solid cathode and the anode 150 can be a conventional anode for example, a solid anode formed from the calendering process as is commonly known in the arts. In some embodiments, the cathode 140 can be a semi-solid cathode and the anode 150 can also be a semi-solid anode as described herein.

Figure 2:
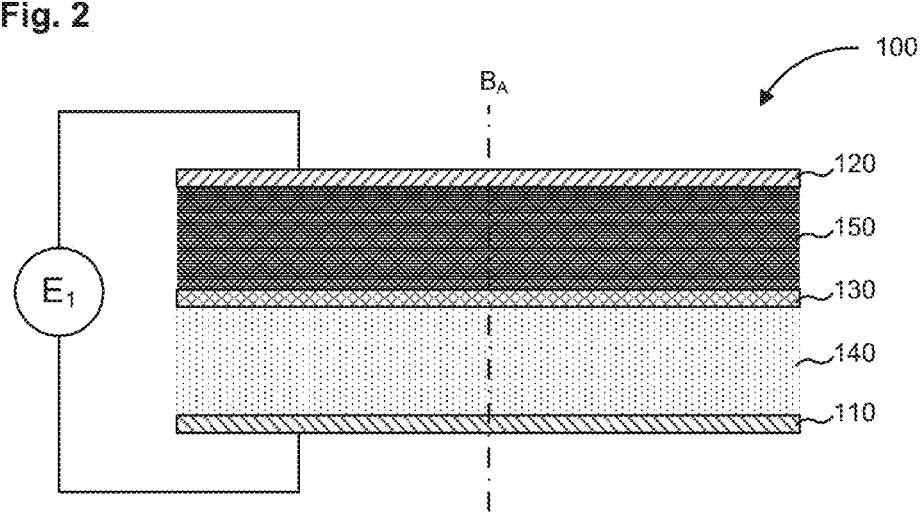
FIG. 2 shows the electrochemical cell of FIG. 1 in a first planar configuration.
Figure 3:
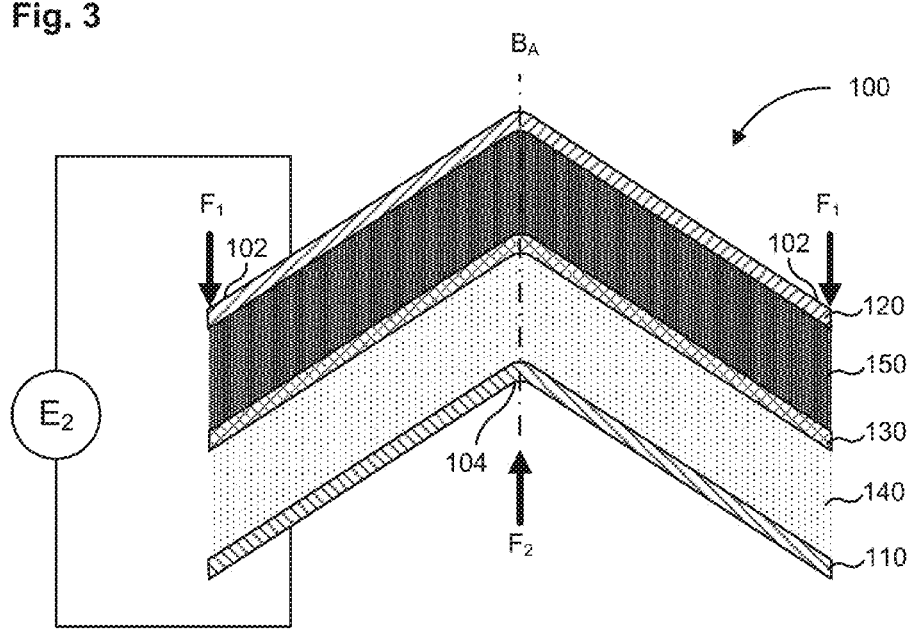
FIG. 3 shows the electrochemical cell of FIG. 1 in a second non-planar configuration.
Figure 4:
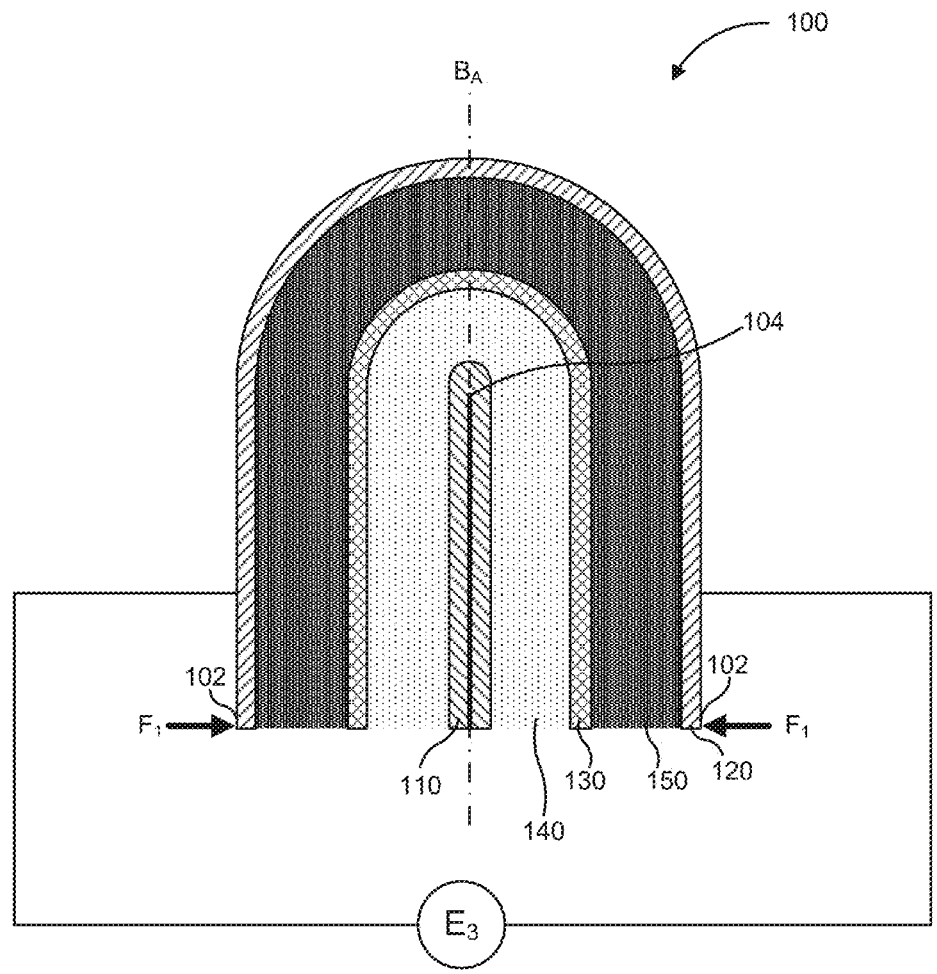
FIG. 4 shows the electrochemical cell of FIG. 1 in a third non-planar configuration.

In some embodiments, the electrochemical cell 100 which includes the semi-solid cathode 140 and the semi-solid anode 150 can have a first operating voltage in a first planar configuration and a second operating voltage in a second non-planar configuration, such that the second operating voltage is substantially similar to the first operating voltage. Referring now to FIGS. 2-4, the electrochemical cell 100 initially has a first planar configuration (FIG. 2). The electrochemical cell 100 defines a bend axis $B_A$, for example, a longitudinal axis, a vertical axis, a diagonal axis, an angular axis, or any other axis about which the electrochemical cell 100 can be bent. The bend axis $B_A$ can be disposed at any location on the electrochemical cell 100. The electrochemical cell 100 has a first operating voltage $E_1$ in the first planar configuration. The electrochemical cell 100 is now bent into a second non-planar configuration (FIG. 3) about the bend axis $B_A$, by applying a first force $F_1$ at the end portions 102 of a top surface the electrochemical cell 100, and applying a second force $F_2$ on a bend portion 104 located along the bend axis of a bottom surface of the electrochemical cell 100. In some embodiments, the force $F_1$ and $F_2$ can be substantially equal. In some embodiments, the force $F_1$ and/or $F_2$ can be applied manually or using an automated setup. In some embodiments, the electrochemical cell 100 can be clamped or otherwise immobilized at the end portions 102 and then bent by applying the force $F_2$ at the bend portion 104.

The bending however, does not affect the operating voltage of the electrochemical cell 100 such that in the second non-planar configuration the electrochemical cell 100 has a second operating voltage $E_2$ substantially similar to the first operating voltage $E_1$. The electrochemical cell 100 can be bent even more from the second non-planar configuration to a third non-planar configuration (FIG. 4) such that the electrochemical cell is folded in half about the bend axis $B_4$. In the third non-planar configuration, the electrochemical cell 100 defines a third operating voltage $E_3$ which is also substantially similar to the first operating voltage $E_1$. The electrochemical cell 100 can be bent multiple times along a plurality of bend axes to define a final non-planar configuration, such that electrochemical cell 100 has a final operating voltage, which is substantially similar to the first operating voltage $E_1$ of the electrochemical cell 100 in the first planar configuration. Furthermore, the semi-solid ion storing redox composition included in the semi-solid cathode 140 and/or the semi-solid anode 150 of the electrochemical cell 100 remains substantially insoluble during operation of the electrochemical cell 100. Thus, the electrochemical cell 100 can be formed into any shape by bending or curving, for example a curved dome shape, a corrugated shape, a spherical shape, an elliptical shape, a polygonal shape, or any other shape such that it can be disposed in a system, apparatus or device having any shape or size without any impact on the operating voltage of the electrochemical cell 100. In some embodiments, the electrochemical cell 100 can have a first temperature in the first planar configuration and a second temperature in the second non-planar configuration such that the second temperature is substantially similar to the first temperature.

Figure 5:
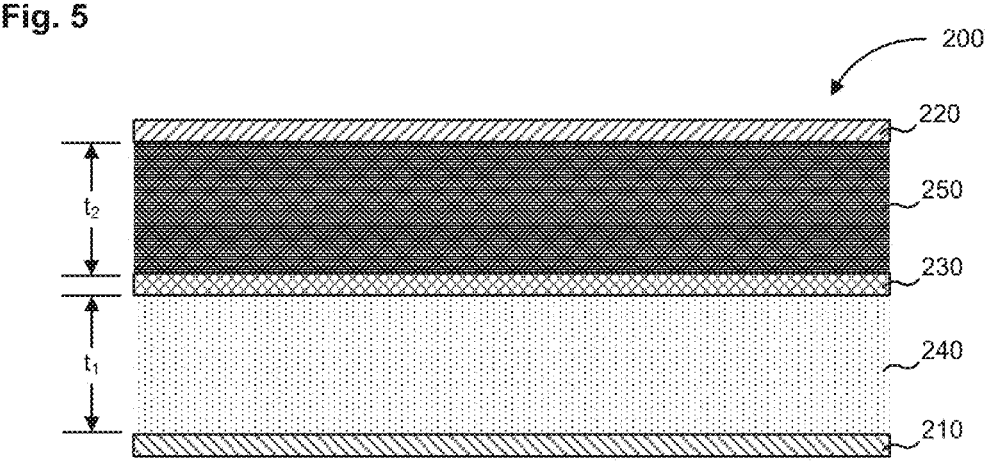
FIG. 5 shows a schematic illustration of an electrochemical cell, according to an embodiment.
Figure 6:
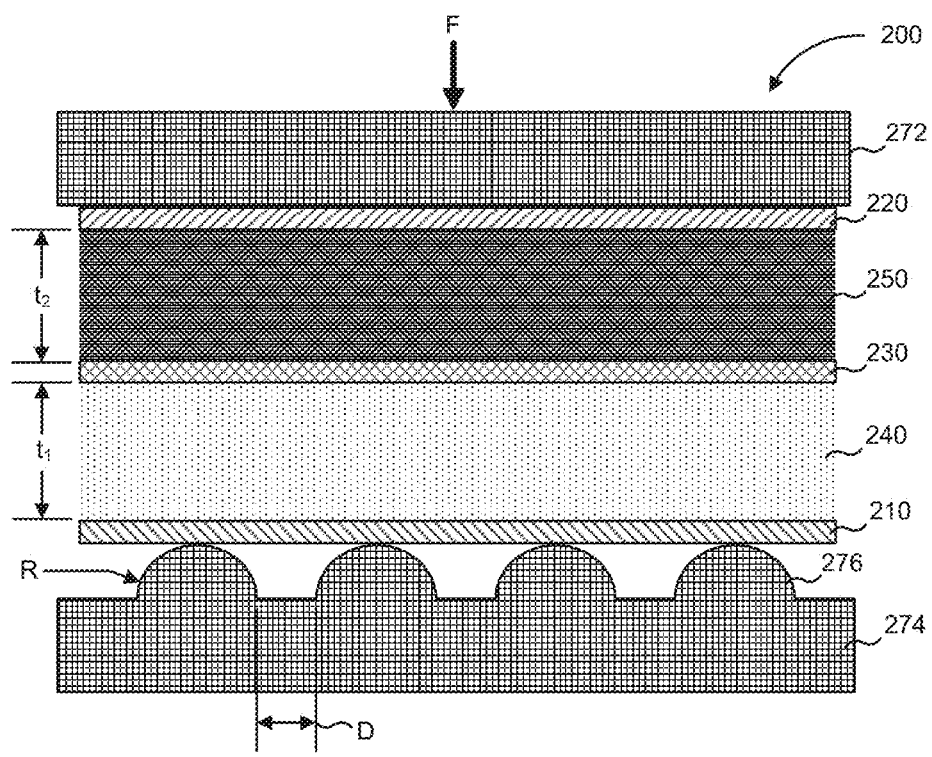
FIG. 6 shows a flat platen and a textured platen for crushing the electrochemical cell of FIG. 5.
Figure 7:
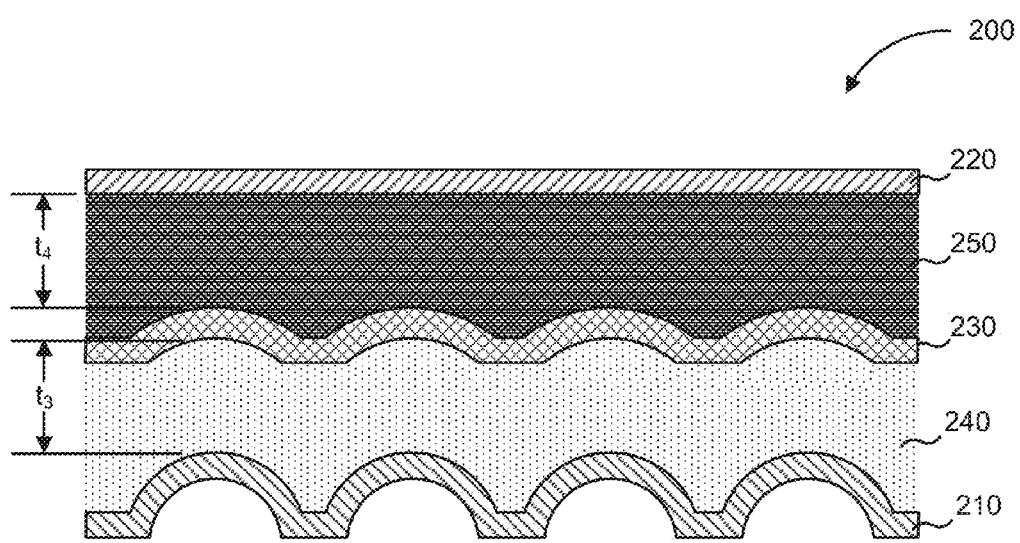
FIG. 7 shows the electrochemical cell of FIG. 5 after crushing between the flat platen and the textured platen of FIG. 6.

In some embodiments, an electrochemical cell includes a semi-solid cathode and/or a semi-solid anode, for example, the semi-solid cathode 140 and the semi-solid anode 150 described herein, such that an open-circuit voltage of the electrochemical cell is substantially unchanged after a thickness of the semi-solid electrodes, for example, the semi-solid cathode and/or semi-solid anode is reduced, for example by about 50% or moe. Referring now to FIGS. 5-7, an electrochemical cell 200 includes a semi-solid cathode 240 disposed on a positive current collector 210, and a semi-solid anode 250 disposed on a negative current collector 210, such that the semi-solid cathode 240 and the semi-solid anode 250 are separated by a separator 230. The electrochemical cell 200 can have a first open-circuit potential $E_4$. The semi-solid cathode 240 has a first thickness $t_1$ and the semi-solid anode 250 has a first thickness $t_2$ such that each of the first thickness $t_1$ and the first thickness $t_2$ is at least about 250 µm. The electrochemical cell 200 and each of the components included therein can be substantially similar to the electrochemical cell 100 described herein, and are therefore not described in further detail.

As shown in FIG. 6 (not to scale), the electrochemical cell 200 can be disposed between a first platen 272 and a second platen 274. The first platen 272 can be substantially flat and the second platen 274 can be a textured platen having a plurality of ridges 276 on a surface proximal to the electrochemical cell 200. In some embodiments, each of the plurality of ridges 276 can be semi-circular and can have a radius R of about 75 mm and can have an inter-ridge spacing D of about 30 mm. In some embodiments, the second platen 274 can be a cylindrical bar. Each of the first platen 272 and the second platen 274 can be made from a strong, inflexible material, for example, metals, plastics, wood, etc. Each of the first platen 272 and the second platen 274 is also electrically insulated from the electrochemical cell 200, for example the first platen 272 and/or the second platen 274 can be formed from an electrically insulating material or coated (e.g., laminated) with an insulating material.

The first platen 272 and the second platen 274 are used to crush the electrochemical cell 200 to reduce a thickness of the semi-solid electrodes included in the electrochemical cell 200. For example, a force in a direction shown by the arrow F can be applied on the first platen 272 while the second platen 274 is held stationary. This urges the first platen 272 towards the electrochemical cell 200 such that the electrochemical cell 200 is crushed between the first platen 272 and the second platen 274 as shown in FIG. 7. The thickness of at least a portion of the semi-solid cathode 240 and the semi-solid anode 250 can be reduced by the crushing such that at least a portion of the semi-solid cathode 240 now has a second thickness $t_3$ and/or at least a portion of the semi-solid anode 250 also has a second thickness $t_4$. In some embodiments, the second thickness $t_3$ of at least a portion of the semi-solid cathode 240 can be less than 50% of the first thickness $t_1$. In some embodiments, the second thickness $t_4$ of at least a portion of the semi-solid anode 250 can also be less than about 50% of the first thickness $t_2$. In some embodiments, a total thickness of the electrochemical cell 200 can be reduced by about 50% by the crushing.

After the crushing, the electrochemical cell 200 can have a second open-circuit voltage $E_5$ which is substantially similar to the first open-circuit voltage $E_4$ before crushing. Therefore, reduction in the thickness of any of the semi-solid cathode 240 and/or semi-solid anode 250 does not affect the open-circuit voltage of the electrochemical cell 200. In some embodiments, a temperature of the electrochemical cell 200 can also be substantially unchanged after the thickness of the semi-solid electrode, for example the semi-solid cathode 240 and/or the semi-solid anode 250 is reduced by about 50%.

In some embodiments, an electrochemical cell which includes a semi-solid cathode and/or a semi-solid anode, for example the electrochemical cell 100, 200 or any other electrochemical cell described herein, is configured to absorb a mechanical force by deforming from a first configuration into a second configuration without mechanical, electrical or thermal failure. For example, the electrochemical cell can be subjected to any mechanical force such as, for example, sudden acceleration or deceleration (mechanical shock), drop on a hard surface, penetration by a sharp object (e.g., a nail), roll over, or crushing. The electrochemical cell is configured to absorb the mechanical force by deforming from a first configuration, for example a planar configuration, to a second configuration, for example a non-planar configuration. The deformation however, does not cause any mechanical, electrical, or thermal failure in the electrochemical cell. For example, the semi-solid cathode and/or anode included in the cell remain mechanically intact (i.e., do not have any cracks, voids or otherwise break), retain their electronic performance (e.g., the operating voltage, open-circuit voltage impedance, charge capacity, and/or energy density remains substantially the same), and do not experience an uncontrollable rise in temperature (i.e., do not experience thermal runaway) after deforming.

In some embodiments, an electrochemical cell which includes a semi-solid cathode and/or a semi-solid anode, for example the electrochemical cell 100, 200 or any other electrochemical cell described herein, can be heated to a high temperature without experiencing thermal runaway. For example, the electrochemical cell can be heated to a temperature of greater than about 140 degrees Celsius without experiencing thermal runaway. In some embodiments, the electrochemical cell can be heated to a temperature of greater than about 150 degrees Celsius without experiencing thermal runaway. Heating of the electrochemical cell to a high temperature can vent the cell, for example the electrolyte included in the semi-solid cathode and/or anode can degrade and release gases. The porous nature of the semi-solid electrode can allow the gases to vent from the semi-solid electrodes and the electrochemical cell efficiently so that any heat is not built up in the electrochemical cell and thermal runaway does not occur. In some embodiments, the heating of the electrochemical cell can be performed in a hot box.

The following examples show the impact of mechanical deformation and heating on the operating voltage and temperature of electrochemical cells. These examples are only for illustrative purposes and are not intended to limit the scope of the present disclosure.

Example 1

Figure 8:
FIG. 8 shows an electrochemical cell in a first planar configuration having a first open-circuit voltage.
Figure 9:
FIG. 9 shows the electrochemical cell of FIG. 8 in a second non-planar configuration having a second open-circuit voltage substantially similar to the first open-circuit voltage.
Figure 10:
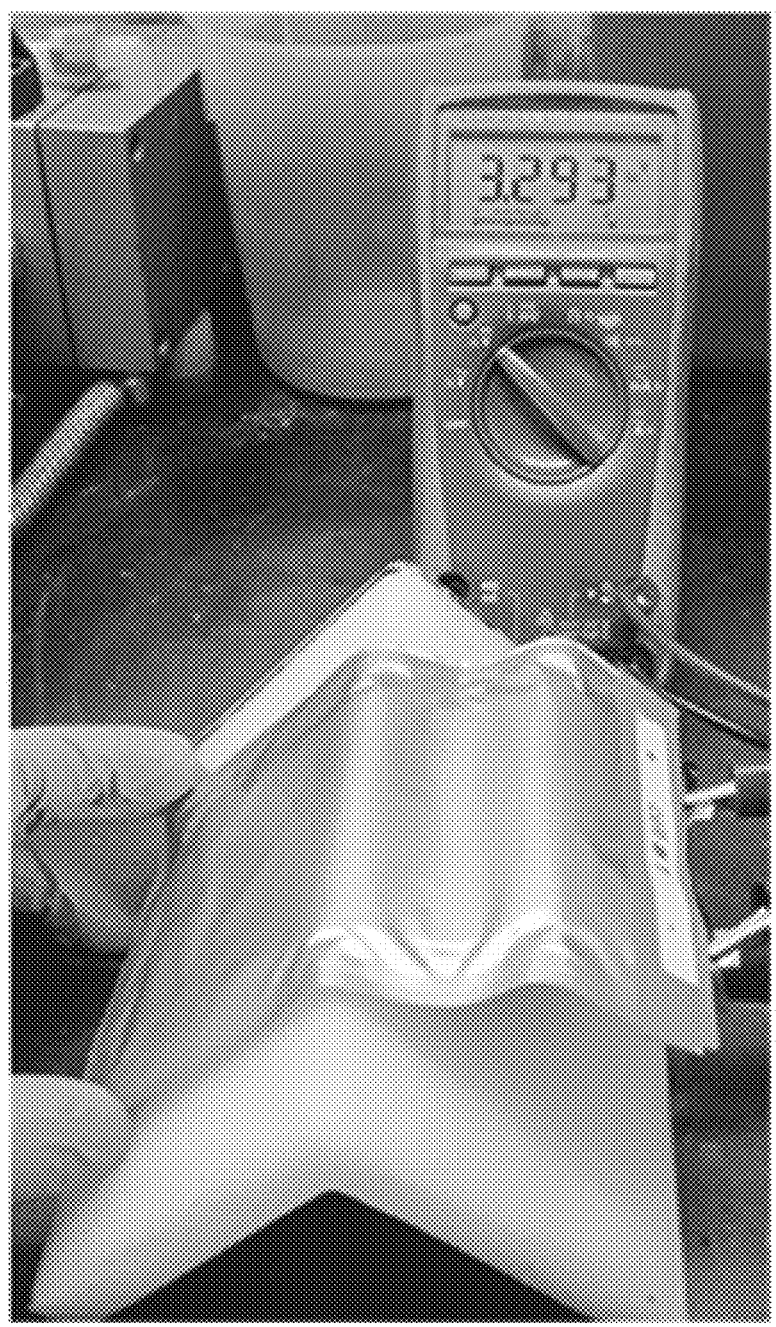
FIG. 10 shows the electrochemical cell of FIG. 8 in a third non-planar configuration having a third open-circuit voltage substantially similar to the first open-circuit voltage.
Figure 11:
FIG. 11 shows the electrochemical cell of FIG. 8 in a fourth non-planar configuration having a fourth open-circuit voltage substantially similar to the first open-circuit voltage.
Figure 12:
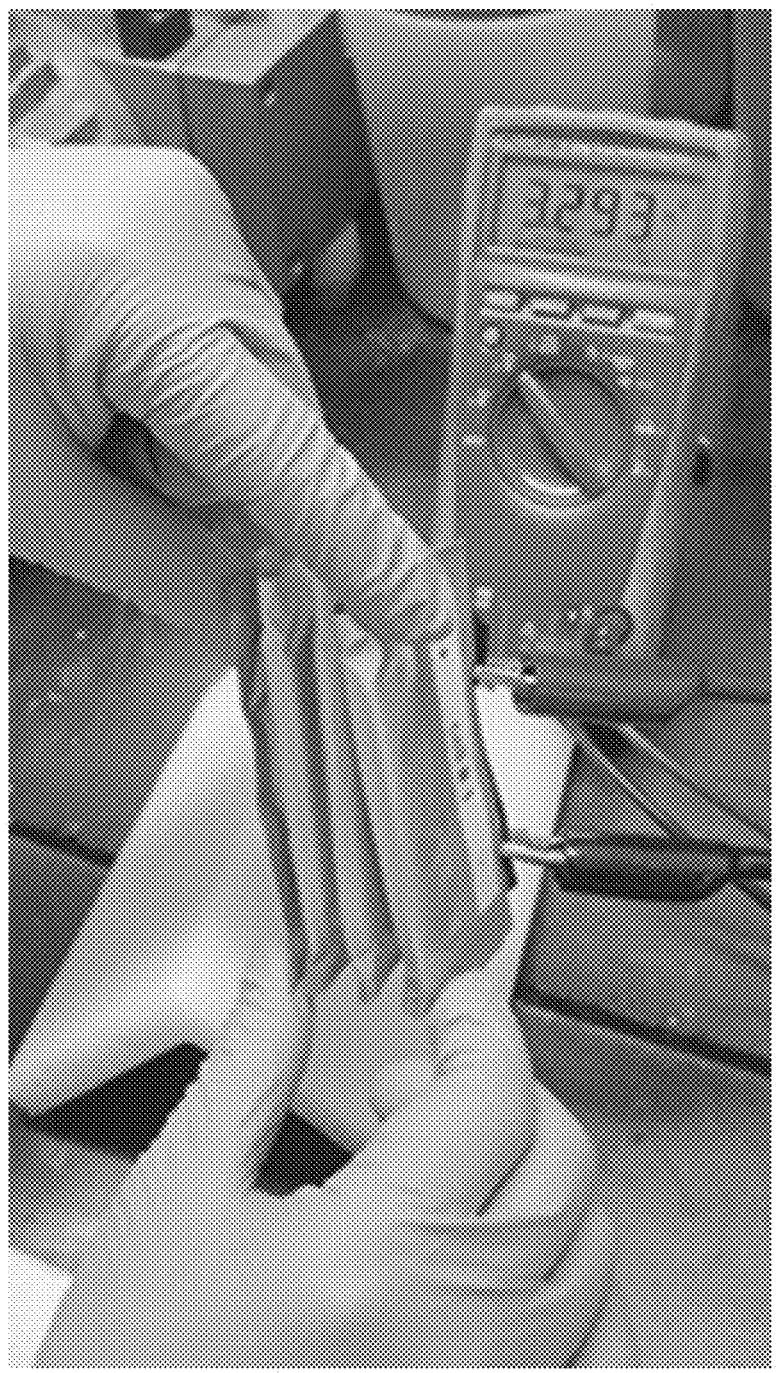
FIG. 12 shows the electrochemical cell of FIG. 8 in fifth non-planar configuration having a fifth open-circuit voltage substantially similar to the first open-circuit voltage.
Figure 13:
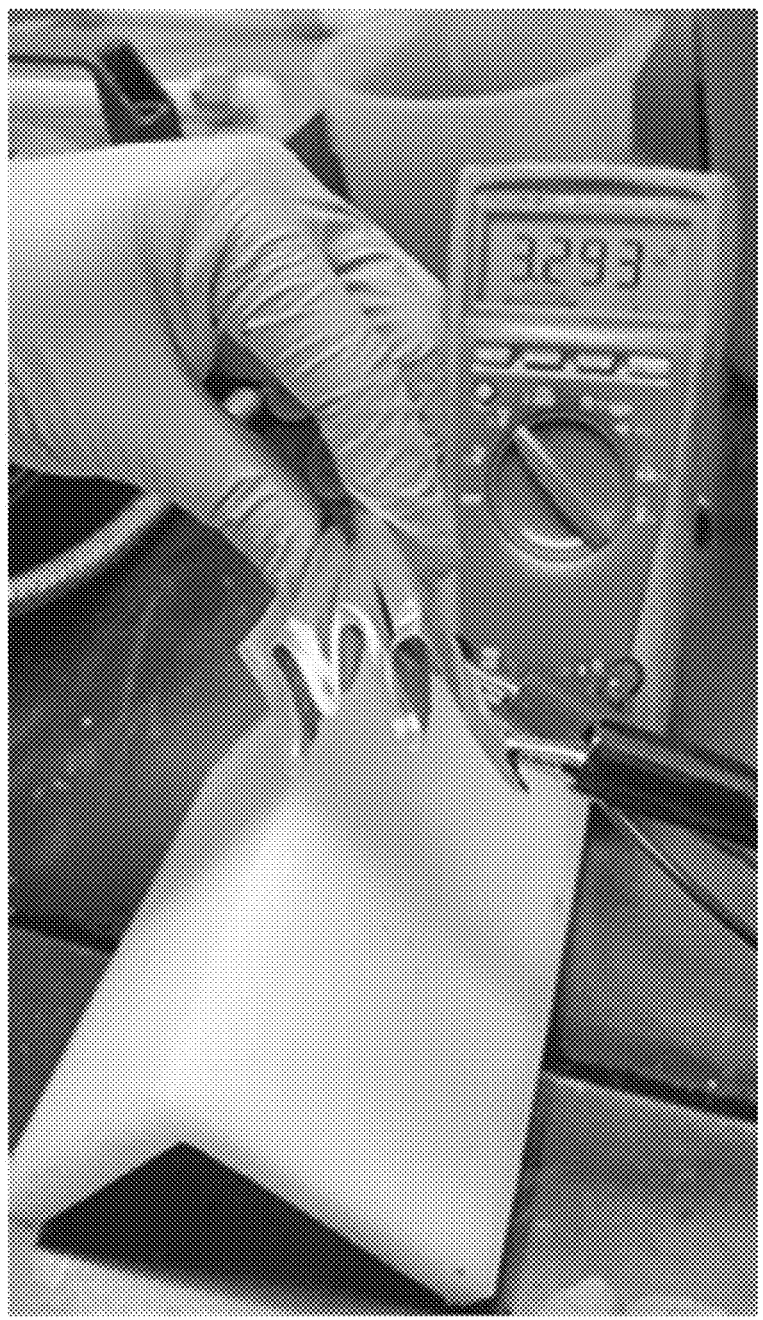
FIG. 13 shows another view of the electrochemical cell of FIG. 12.
Figure 14:
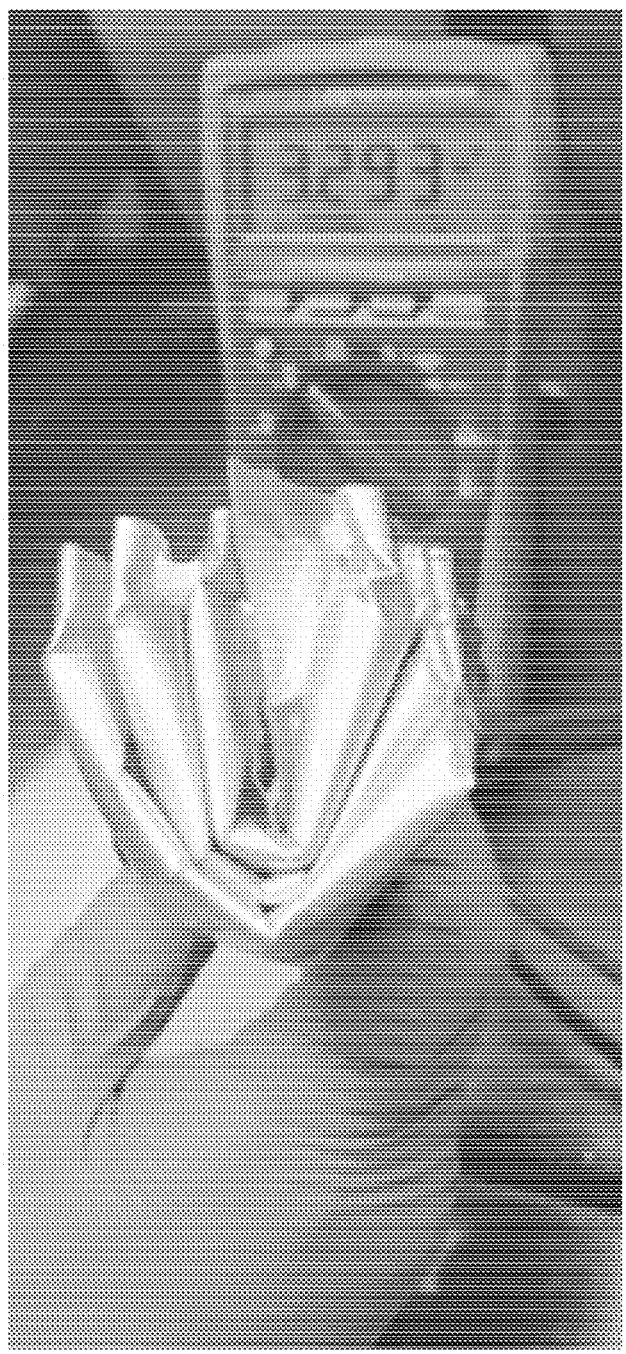
FIG. 14 shows the electrochemical cell of FIG. 8 in a sixth non-planar configuration having a sixth open-circuit voltage substantially similar to the first open-circuit voltage.

An electrochemical cell example 1 (also referred to as "the Ex. 1 cell") was prepared from a semi-solid cathode and a semi-solid anode. The Ex. 1 cell was subjected to mechanical deformation and its open-circuit voltage was measured. The semi-solid cathode included about 40% by volume of LFP as the active material, about 1.5% by volume of carbon black (Ketjen™), and about 58.5% by volume of an electrolyte. The semi-solid anode included about 35% by volume of graphite as the active material, about 2% by volume of C45 carbon as the conductive material, and about 63% by volume of an electrolyte. Each electrode had a thickness of about 500 µm. The semi-solid electrodes were packaged in a prismatic pouch to form the Ex. 1 cell, such that the Ex. 1 cell had a first planar configuration as shown in FIG. 8. The Ex. 1 cell was fully discharged and then coupled to a voltmeter. In the first planar configuration, the Ex. 1 cell had a first open-circuit voltage of about 3.293 V.

Referring now to FIGS. 9-16, the Ex. 1 cell was subjected to a series of mechanical deformations to urge the electrochemical cell into non-planar configurations. The mechanical deformations were performed by manually folding the planar Ex. 1 cell. The folds were added by bending the planar Ex. 1 cell over a 90 degree angle form. In a second non-planar (FIG. 9), the Ex. 1 cell was bent once such that a single fold was added to the Ex. 1 cell. In the second non-planar configuration, the Ex. 1 cell had a second open-circuit voltage of about 3.293 V substantially similar to the first open-circuit voltage.

In a third non-planar configuration (FIG. 10), the Ex. 1 cell was bent a second time, such that the Ex. 1 cell now had three folds. In the third non-planar configuration the Ex. 1 cell had a third open-circuit voltage of about 3.293 V substantially similar to the first open-circuit voltage.

In a fourth non-planar configuration (FIG. 11) the Ex. 1 cell was bent a third time, such that the Ex. 1 cell now had five folds. In the fourth non-planar configuration, the Ex. 1 cell had a fourth open-circuit potential of about 3.293 V substantially similar to the first open-circuit voltage.

In a fifth non-planar configuration (FIGS. 12-13) the Ex. 1 cell was bent a fourth time, such that the Ex. 1 cell now had six folds. In the fifth non-planar configuration, the Ex. 1 cell had a fifth open-circuit voltage of about 3.293 V substantially similar to the first open-circuit voltage.

Figure 15:
FIG. 15 shows the electrochemical cell of FIG. 8 after remaining in the sixth non-planar configuration for a period of one month and having a seventh open-circuit voltage substantially similar to the first open-circuit voltage.

In a sixth non-planar (FIG. 14) configuration, the Ex. 1 cell was bent a fifth time such that the Ex. 1 cell was folded in half and included seven folds. In the sixth non-planar configuration, the Ex. 1 cell had a sixth open-circuit voltage of about 3.293 V substantially similar to the first open-circuit voltage. The Ex. 1 cell was maintained in the sixth non-planar configuration for about 1 month and the open-circuit voltage was measured again (FIG. 15). The Ex. 1 cell now had a seventh open-circuit voltage of about 3.282 V, only about 0.011 V lower then the first open-circuit voltage of the Ex. 1 cell in the first planar configuration (i.e., substantially similar to the first open-circuit voltage).

Figure 16:
FIG. 16 shows the electrochemical cell of FIG. 8 in a second approximately planar configuration obtained by unfolding the electrochemical cell in the sixth non-planar configuration. The electrochemical cell has an eighth open-circuit voltage substantially similar to the first open-circuit voltage.

The Ex. 1 cell was subsequently unfolded to urge the Ex. 1 cell into a seventh planar configuration (FIG. 16). The Ex. 1 cell now had an eighth open-circuit voltage of about 3.281 V, only about 0.012 V lower then the first open-circuit voltage of the Ex. 1 cell in the first planar configuration (i.e substantially similar to the first open-circuit voltage).

Example 2

An electrochemical cell example 2 (also referred to as "the Ex. 2 cell") was prepared from a semi-solid cathode and a semi-solid anode. The semi-solid cathode included about 35% by volume of NMC as the active material, about 2% by volume of C45 carbon as the conductive material, and about 63% by volume of an electrolyte. The semi-solid anode included about 35% by volume of graphite as the active material, about 2% by volume of C45 carbon as the conductive material, and about 63% by volume of an electrolyte. Each electrode had a thickness of about 500 µm. The semi-solid electrodes were packaged in a prismatic pouch to form the Ex. 2 cell such that the packaged Ex. 2 cell had a thickness of about 1 mm. Three replications of the example 2 cell, the Ex. 2a cell, the Ex. 2b cell, and the Ex. 2c cell (collectively referred to as "the Ex. 2 cells") were prepared. Each of the Ex. 2 cells was charged to a 100% state-of-charge (SOC) and the initial operating voltage and temperature was measured at an ambient temperature of about 23 degrees Celsius. Each of the Ex. 2 cells had a charge capacity of about 1.2 Ah.

Figure 17A:
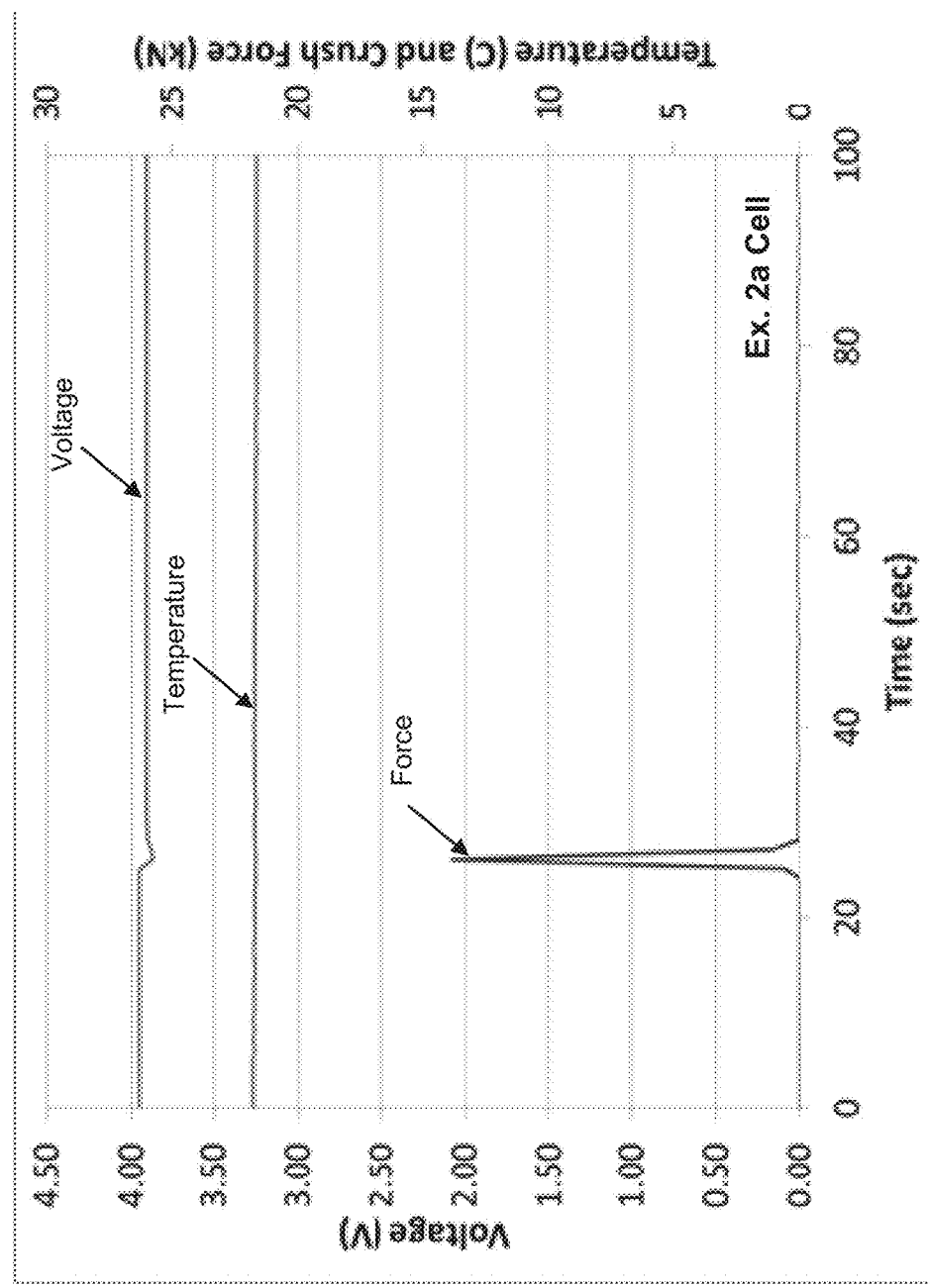
FIGS. 17A-C are plots showing the operating voltage and temperature of three replicates of an electrochemical cell before and after crushing.
Figure 17B:
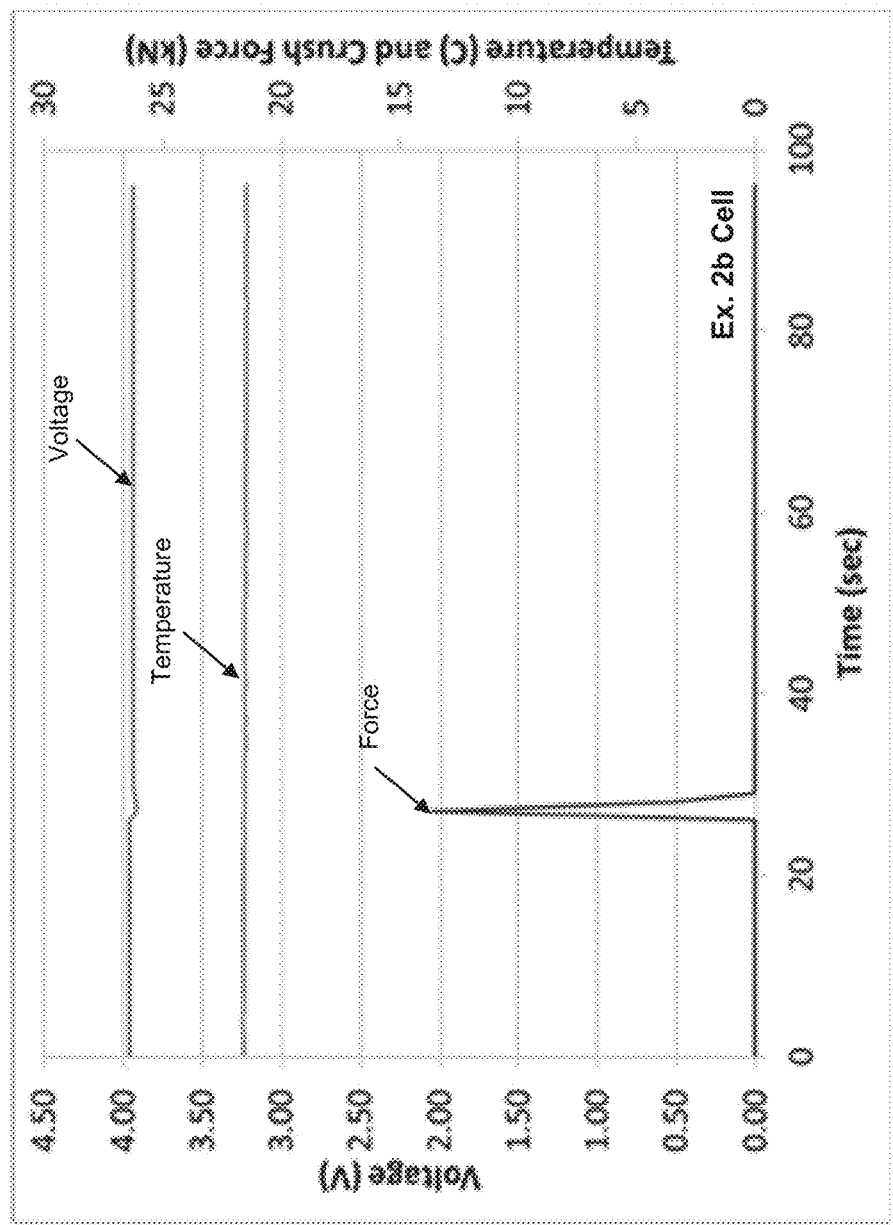
Figure 17C:
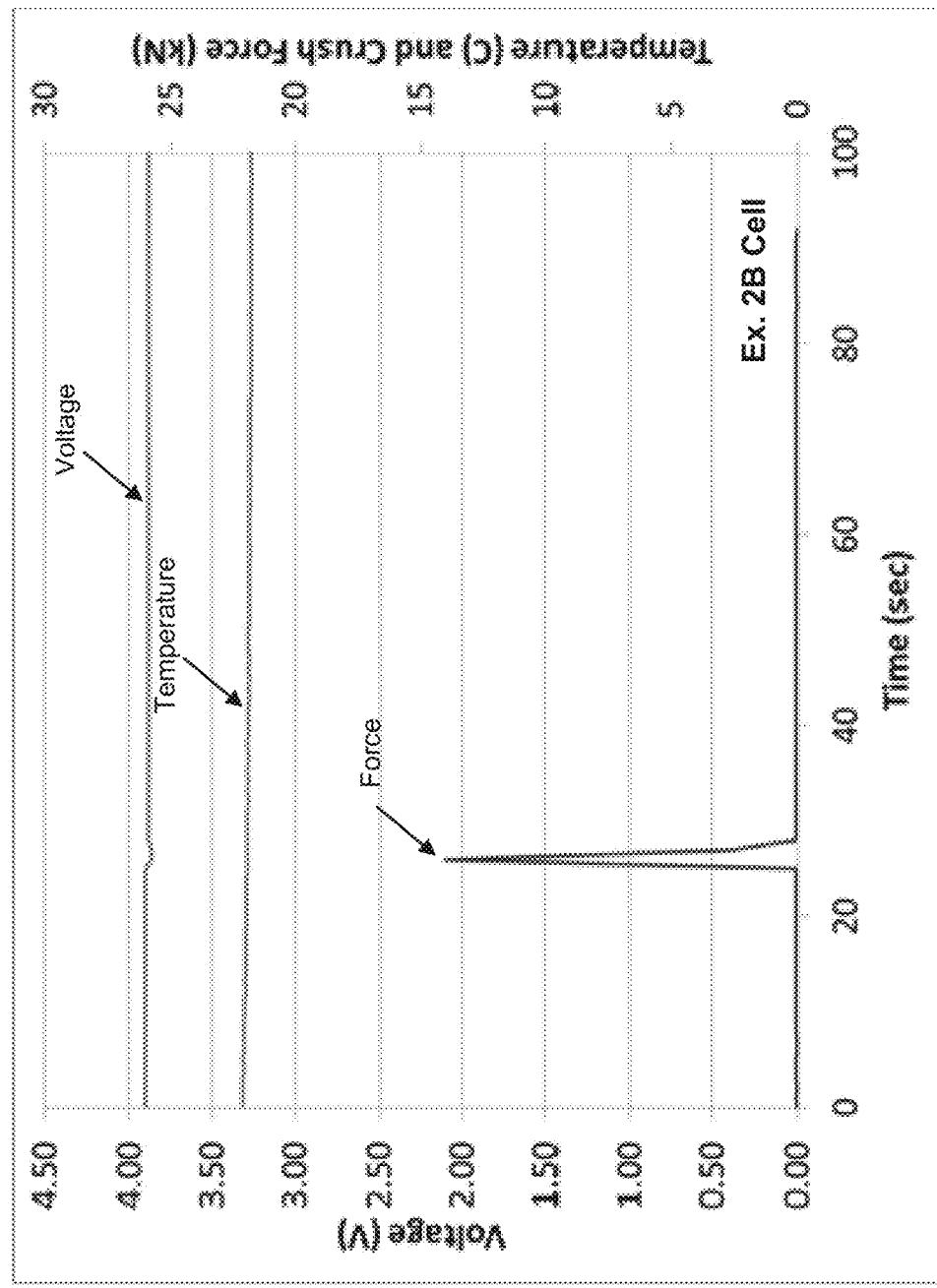

The Ex. 2 cells were then crushed using a cylindrical bar which applied a peak crush force of about 13.4 kN to the Ex. 2 cells, such that the thickness of the Ex. 2 cells was reduced to about 50% of original uncrushed thickness of the Ex. 2 cells. As can be seen in FIGS. 17A-C, the operating voltage and temperature of each of the Ex. 2 cells after crushing remained substantially similar to the operating voltage and temperature of the uncrushed Ex. 2 cells.

Example 3

An electrochemical cell example 3 (also referred to as "the Ex. 3 cell") was prepared from a semi-solid cathode and a semi-solid anode. The semi-solid cathode included about 35% by volume of NMC as the active material, about 2% by volume of C45 carbon as the conductive material, and about 63% by volume of an electrolyte. The semi-solid anode included about 35% by volume of graphite as the active material, about 2% by volume of C45 as the conductive material, and about 63% by volume of an electrolyte. Each electrode had a thickness of about 500 µm. The semi-solid electrodes were packaged in a prismatic pouch to form the Ex. 3 cell. Two replicates of the Ex. 3 cell, the Ex. 3a cell, and the Ex. 3b cell, (collectively referred to as "the Ex. 3 cells") were prepared. Each of the Ex. 3 cells was charged to a 100% state-of-charge (SOC) and the initial operating voltage and temperature was measured at an ambient temperature of about 23 degrees Celsius. Each of the Ex. 3 cells had a charge capacity of about 1.2 Ah.

Figure 18A:
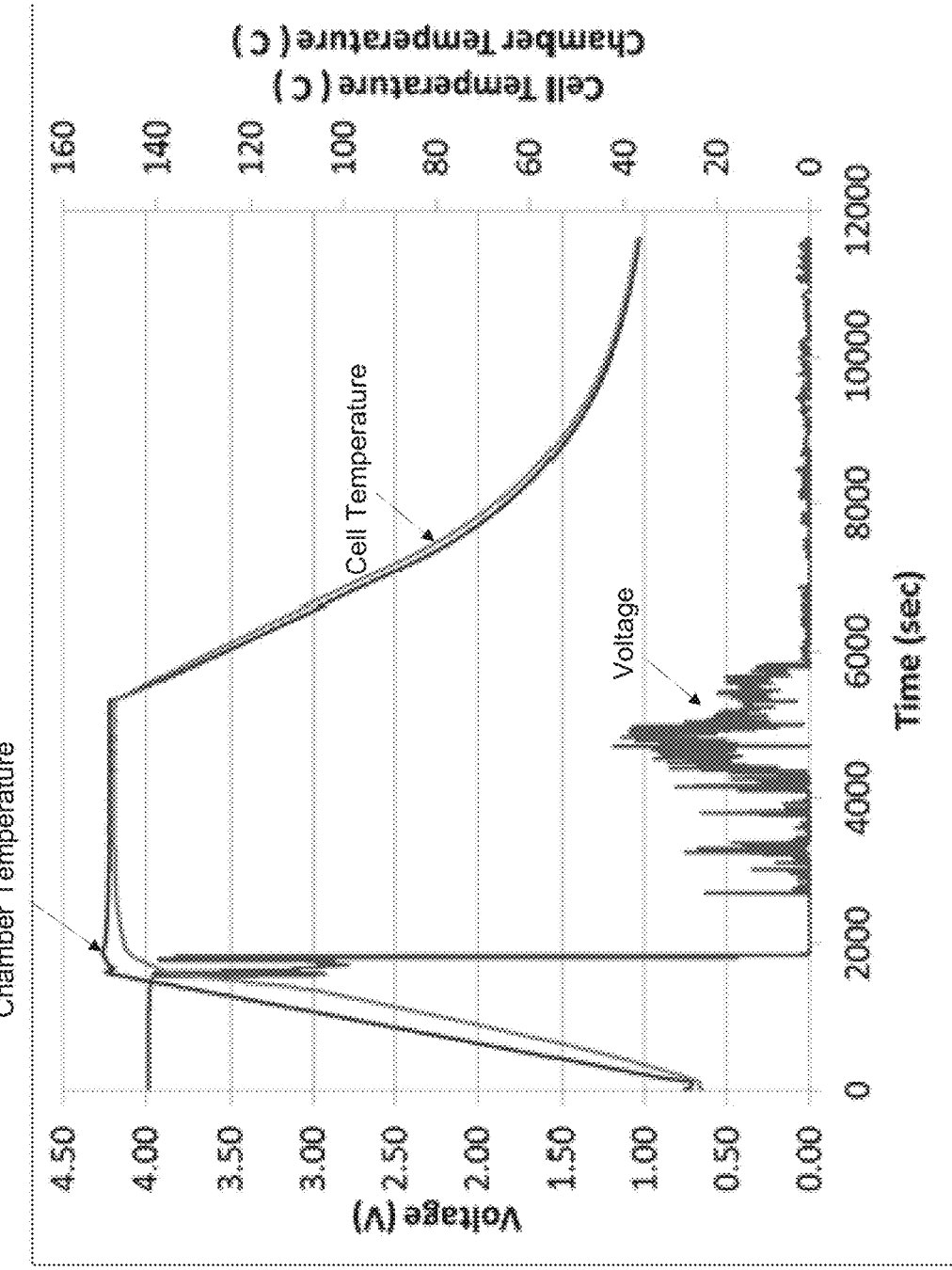
FIGS. 18A-B are plots showing the operating voltage and temperature of two replicates of an electrochemical cell at room temperature and on heating the electrochemical cells to a temperature of greater than about 140 degrees Celsius.
Figure 18B:
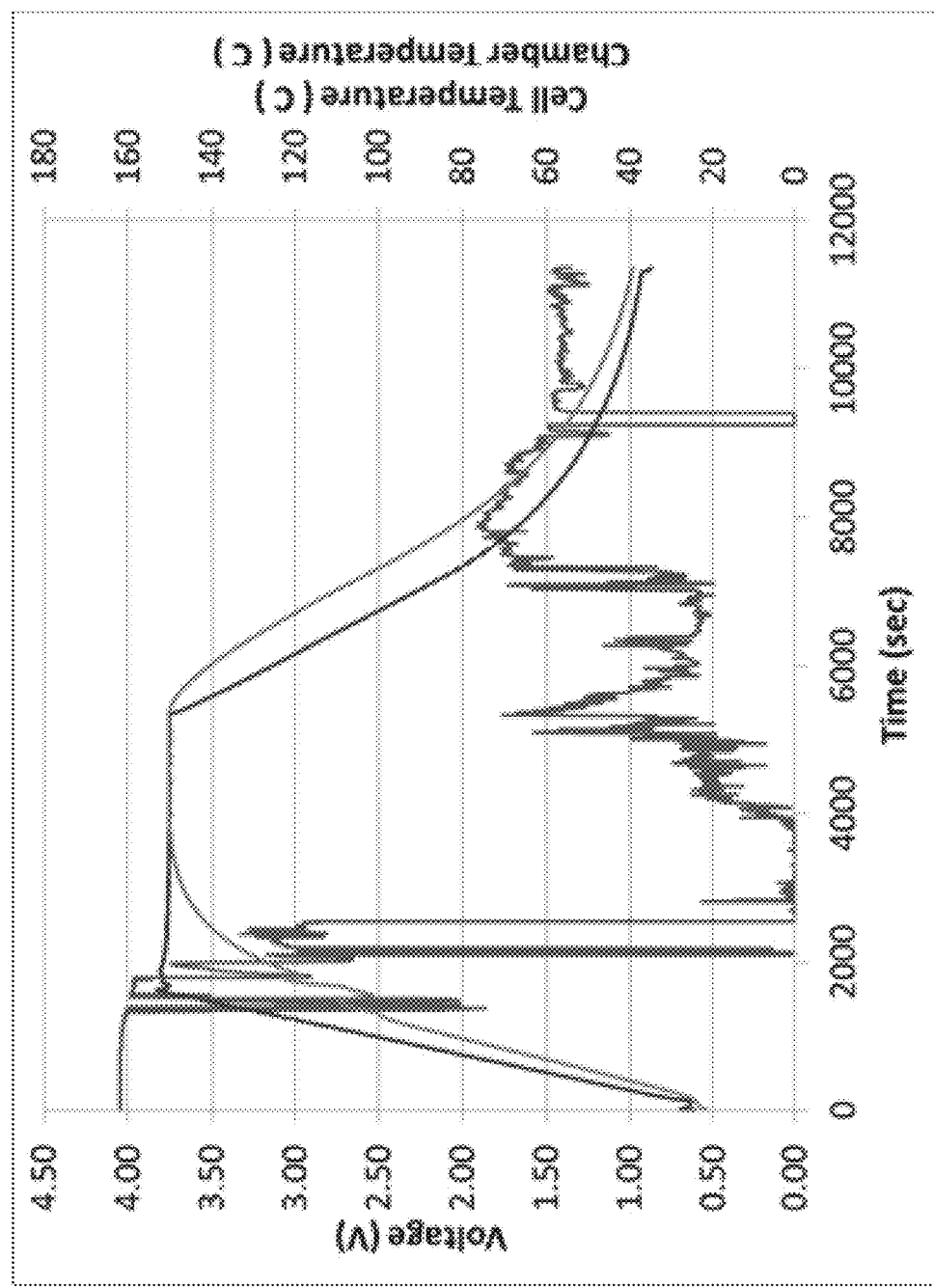

The Ex. 3 cells were heated to a temperature of about 150 degrees Celsius in a hotbox, and the operating voltage and temperature of the Ex. 3 cells was measured. As can be seen in FIGS. 18A-B, the Ex. 3 cells vent at a temperature of about 140 degrees Celsius indicated by a sharp drop in the operating voltage, however no thermal runaway is observed.

Example 4

An electrochemical cell example 4 (also referred to as "the Ex. 4 cell") was prepared from a semi-solid cathode and a semi-solid anode. The semi-solid cathode included about 45% by volume of LFP as the active material, about 1.8% by volume of Ketjen black as the conductive material, and about 53.2% by volume of an electrolyte. The semi-solid anode included about 45% by volume of graphite as the active material, about 2% by volume of C45 carbon as the conductive material, and about 53% by volume of an electrolyte. Each electrode had a thickness of about 450 μm for the cathode and 390 μm for the anode. The semi-solid electrodes were packaged in a prismatic pouch to form the Ex. 4 cell. Two replicates of the Ex. 4 cell, the Ex. 4a cell, and the Ex. 4b cell, (collectively referred to as "the Ex. 4 cells") were prepared. Each of the Ex. 4 cells was charged to a 100% state-of-charge (SOC) and the initial operating voltage and temperature was measured at an ambient temperature of about 23 degrees Celsius. Each of the Ex. 4 cells had a charge capacity of about 1.2 Ah and a resistance of about 2 mOhm.

Figure 19:
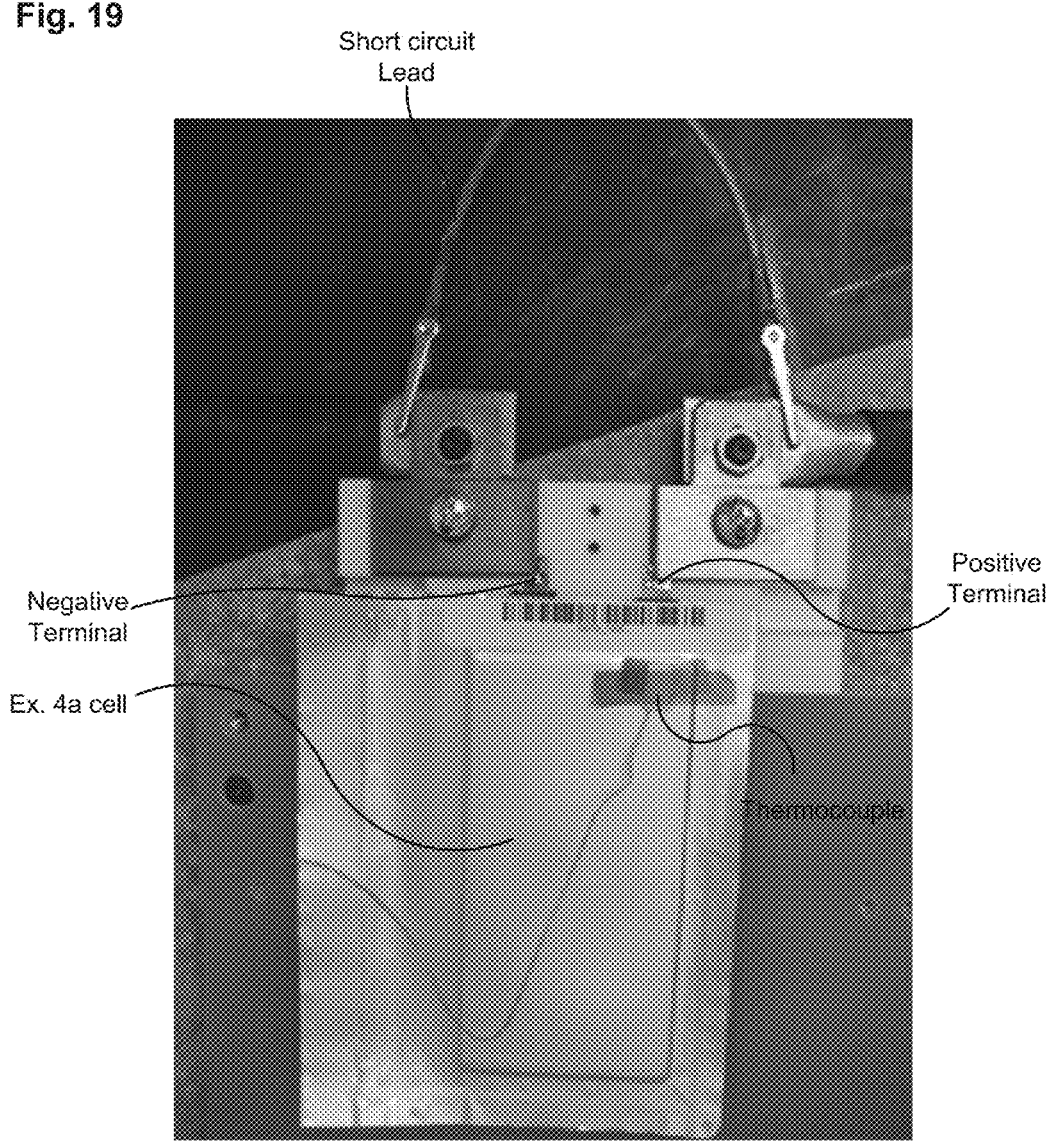
FIG. 19 shows an electrochemical cell with a positive terminal and a negative terminal of the electrochemical cell externally short circuited.

Each of the Ex. 4 cells was subjected to a short circuit test. FIG. 19 shows the Ex. 4a cell in the short circuit configuration. A positive terminal and a negative terminal of the Ex. 4a cell were shorted using a short circuit lead. A thermocouple was mounted on a side wall of the prismatic pouch of the Ex. 4a cell proximal to the positive terminal using adhesive tape. The thermocouple and was used to monitor the temperature of the electrochemical cell, along with the voltage and current of the Ex. 4a cell in real time. The Ex. 4b cell was tested for short circuit performance in a similar fashion.

Figure 20A:
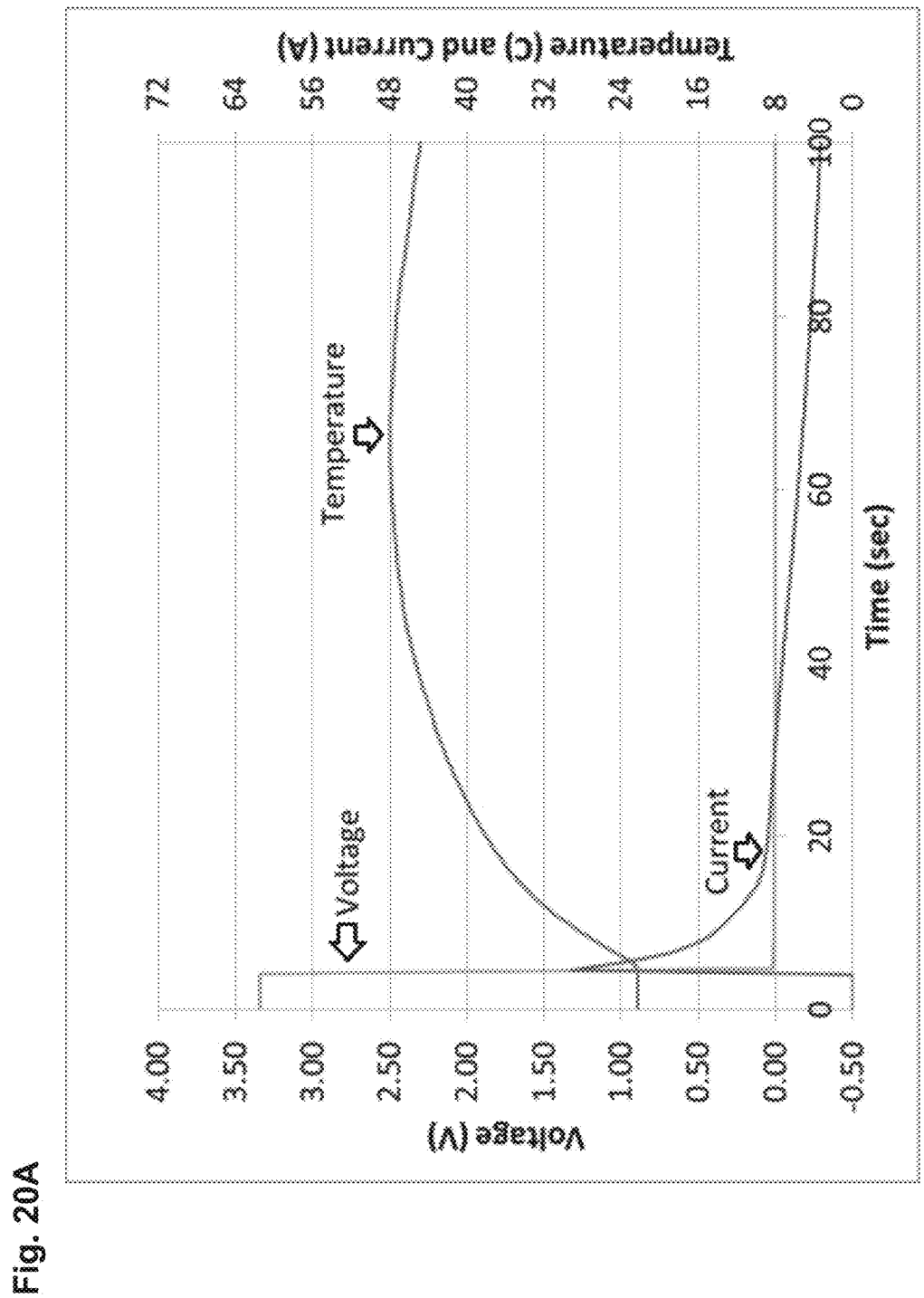
FIGS. 20A and 20B are plots showing the voltage, temperature and current of two replicates of the electrochemical cell of FIG. 19 in response to the external short circuit.
Figure 20B:
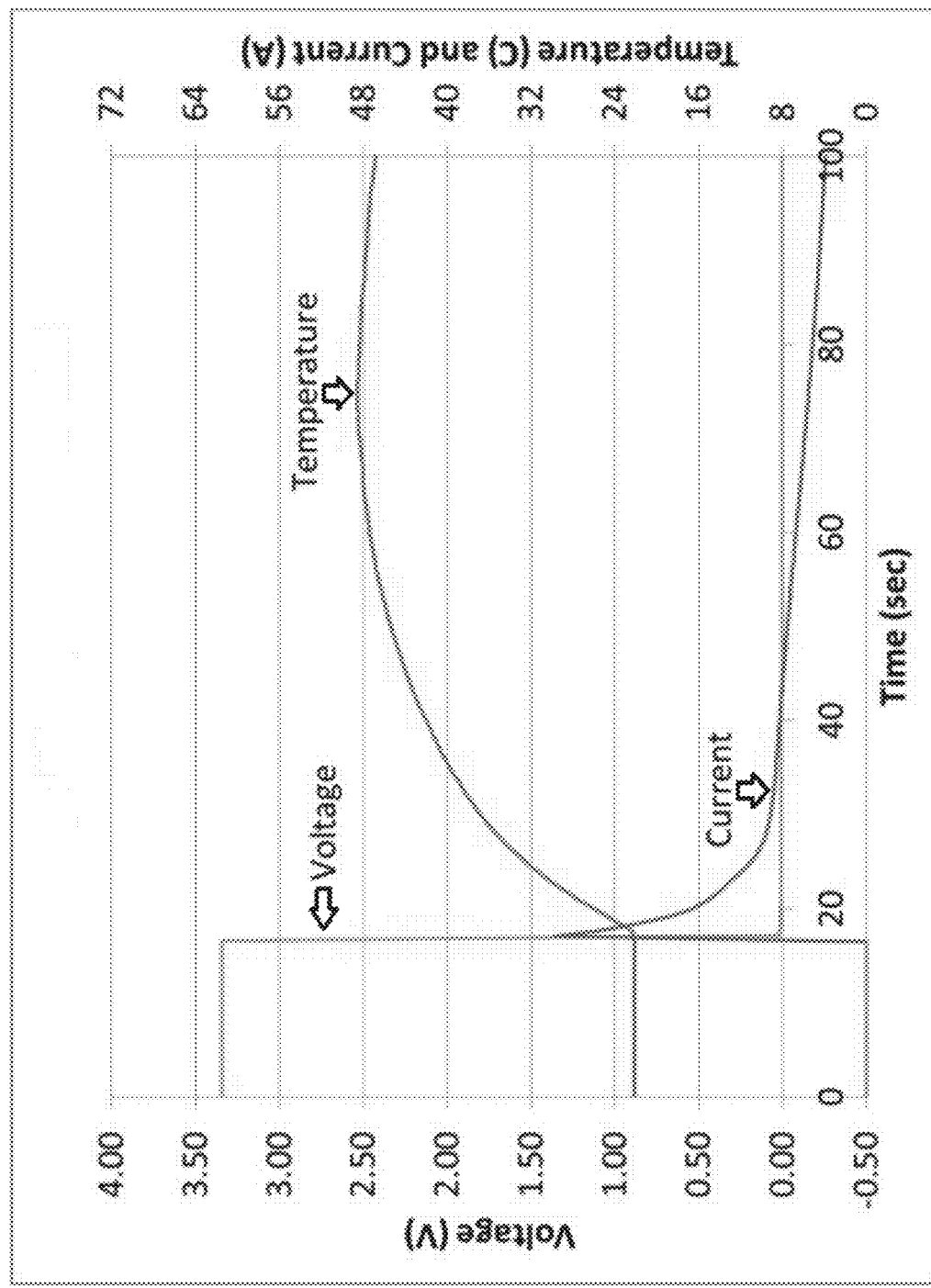
Figure 21A:
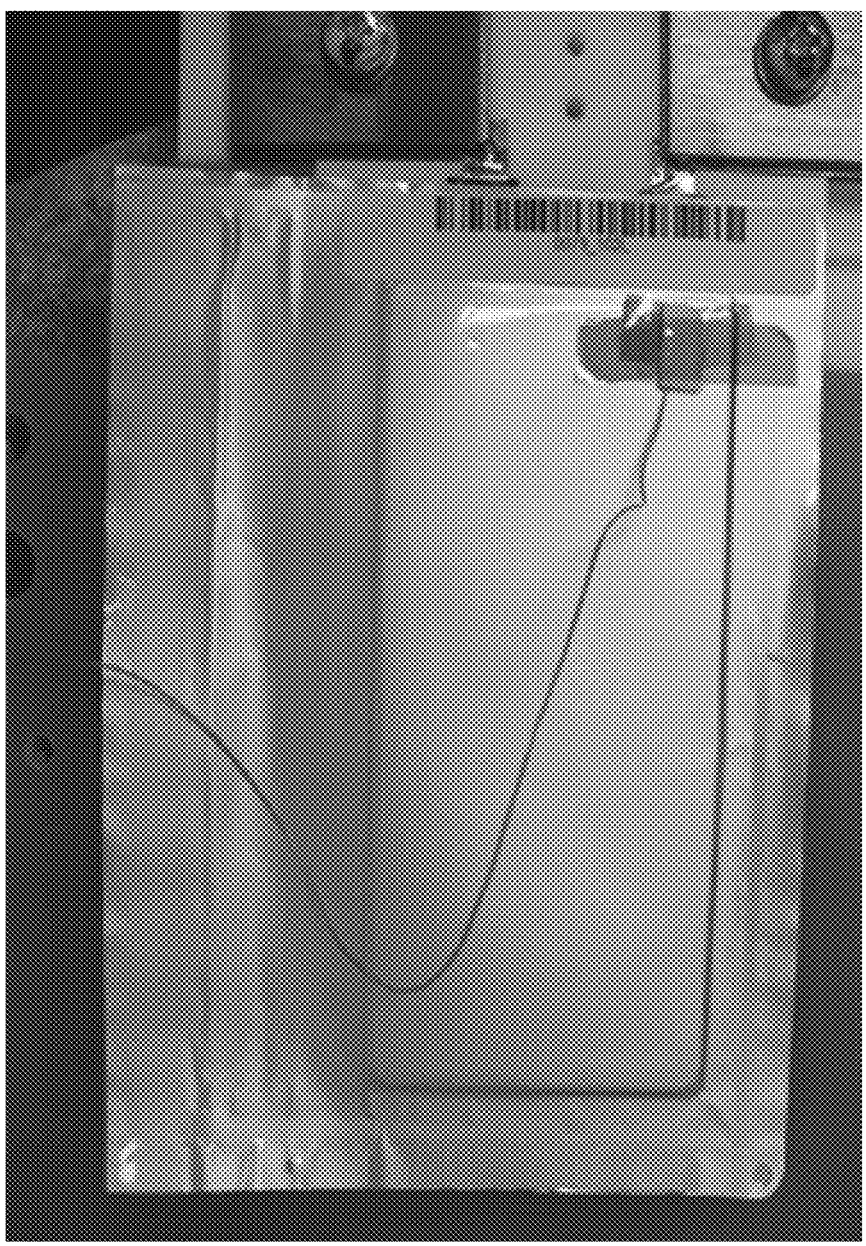
FIGS. 21A and 21B show optical images of the two replicates of the electrochemical cell of FIG. 19 after the external short circuit test.
Figure 21B:
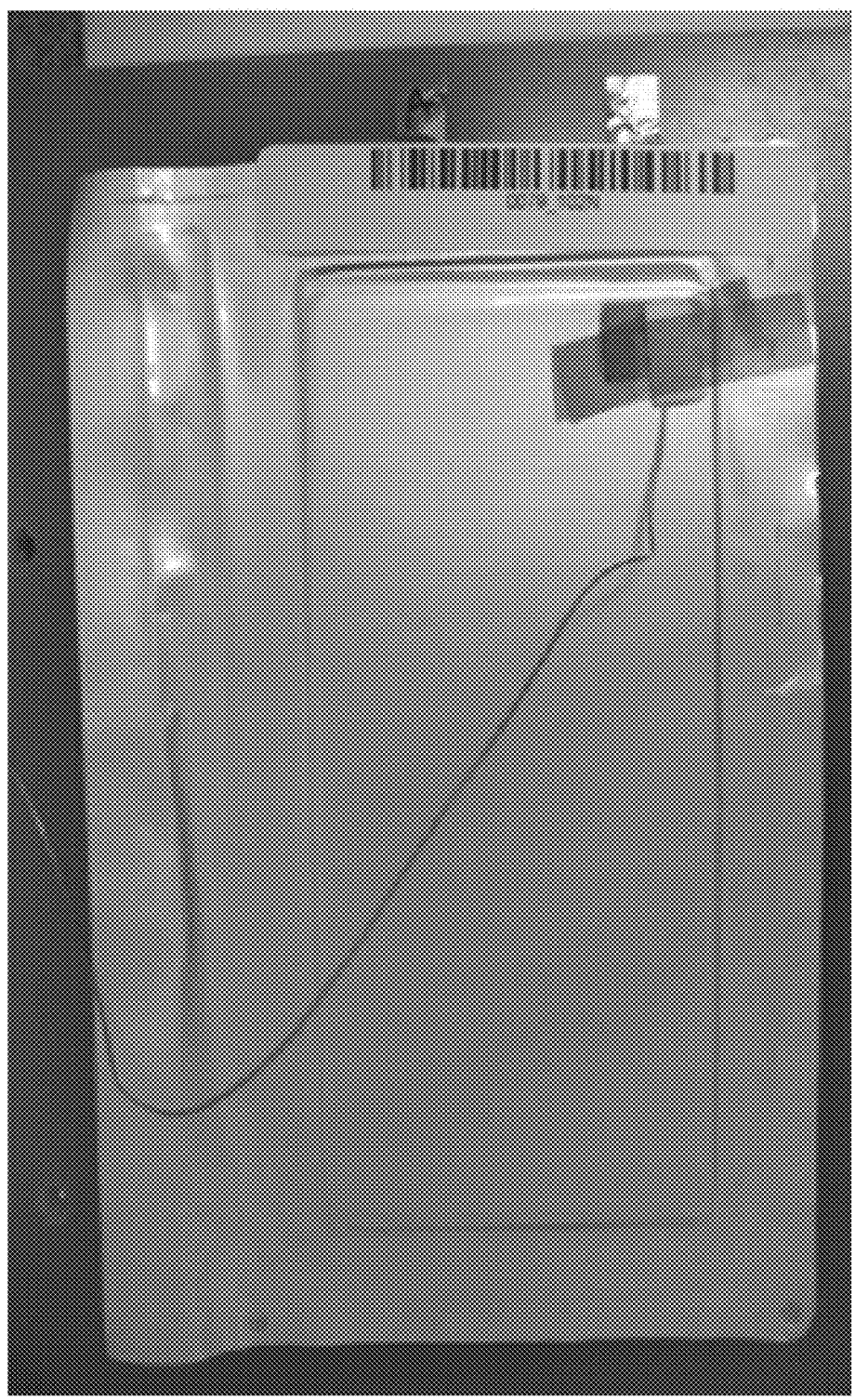

FIGS. 20A and 20B show the voltage, current and temperature of the Ex. 4a cell and the Ex. 4b cell, respectively observed during the short circuit test. The Ex. 4a cell had a maximum short circuit current of about 29.2 A and a maximum short circuit temperature of about 48 degrees Celsius. The Ex. 4b cell had a maximum short circuit current of about 48.5 degrees Celsius and a maximum short circuit current of about 29.7 A. FIGS. 21A and 21B show images of the Ex. 4a cell and the Ex. 4b cell, respectively after the Ex. 4 cells had been subjected to the short circuit test. No venting or thermal runaway was observed in either of the cells. Furthermore, the Ex. 4 cells maintained their vacuum and there was no observable physical deformation of the Ex. 4 cells.

Example 5

An electrochemical cell example 5 (also referred to as "the Ex. 5 cell") was prepared from a semi-solid cathode and a semi-solid anode. The semi-solid cathode included about 45% by volume of LFP as the active material, about 1.8% by volume of Ketjen black as the conductive material, and about 53.2% by volume of an electrolyte. The semi-solid anode included about 45% by volume of graphite as the active material, about 2% by volume of C45 carbon as the conductive material, and about 53% by volume of an electrolyte. Each electrode had a thickness of about 450 μm for the cathode and 390 μm for the anode. The semi-solid electrodes were packaged in a prismatic pouch to form the Ex. 5 cell. Five replicates of the Ex. 5 cell, the Ex. 5a cell, the Ex. 5b cell, the Ex. 5c cell, the Ex. 5d cell, and the Ex. 5e cell (collectively referred to as "the Ex. 5 cells") were prepared. Each of the Ex. 5 cells was charged to a 100% state-of-charge (SOC) and the initial operating voltage and temperature was measured at an ambient temperature of about 23 degrees Celsius.

Figure 22:
FIG. 22 shows an apparatus for performing a blunt rod piercing test on a prismatic electrochemical cell.

Each of the Ex. 5 cells was subjected to a blunt rod penetration test and the voltage and temperature of the Ex. 5 cells was monitored in real time. FIG. 22 shows the apparatus used to perform the blunt rod penetration test. The blunt rod penetration apparatus included a top plate and a bottom plate. Each of the top plate and the bottom plate were substantially flat and were formed from aluminum. The top plate and the bottom plate are disposed in a protective cage, such that a first surface of the top plate and a second surface of the bottom plate are substantially parallel to and face each other. The top aluminum plate includes three equally spaced through holes along a longitudinal axis of the top plate. Each of the holes is configured to receive a 3 mm diameter blunt penetration rod. Each of the Ex. 5 cells was disposed between the first surface of the top plate and the second surface of the bottom plate. Said another way, the Ex. 5 cell was sandwiched between the top plate and the bottom plate. The Ex. 5 cells were heated to about 55 degrees Celsius while sandwiched between the top plate and the bottom plate. A thermocouples was dispose on an external surface of the a side wall of the Ex. 5 cells proximal to the positive terminal of the Ex. 5 cells and was used to monitor the temperature of the Ex. 5 cells. The temperature and the voltage of each of the Ex. 5 cell was monitored in real time while subjecting the cells to the penetration test.

Figure 23A:
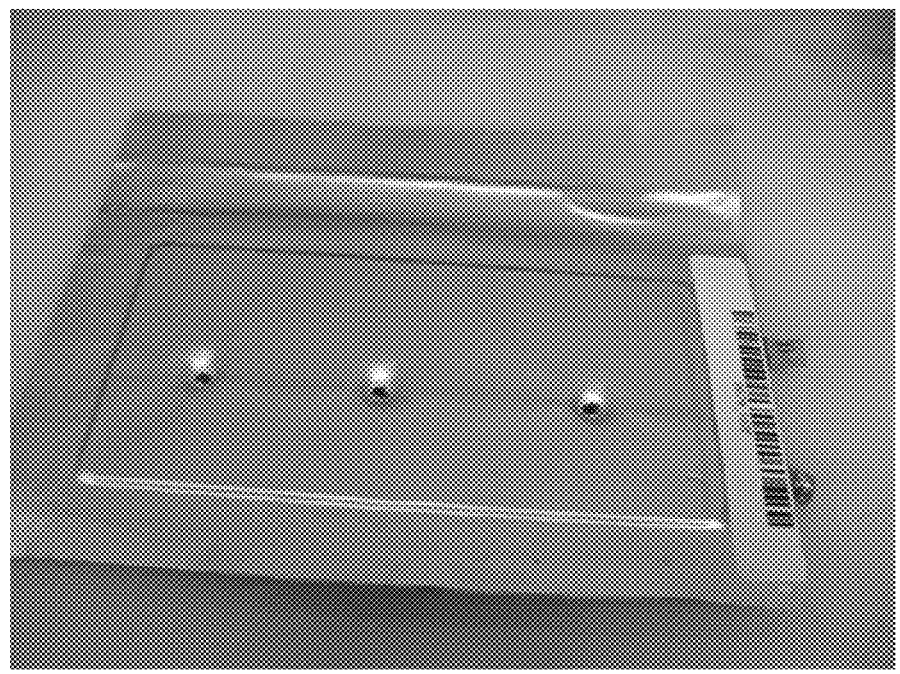
FIG. 23A shows an electrochemical cell pierced at three locations along a longitudinal axis of the electrochemical cell by a blunt piercing rod.
Figure 23B:
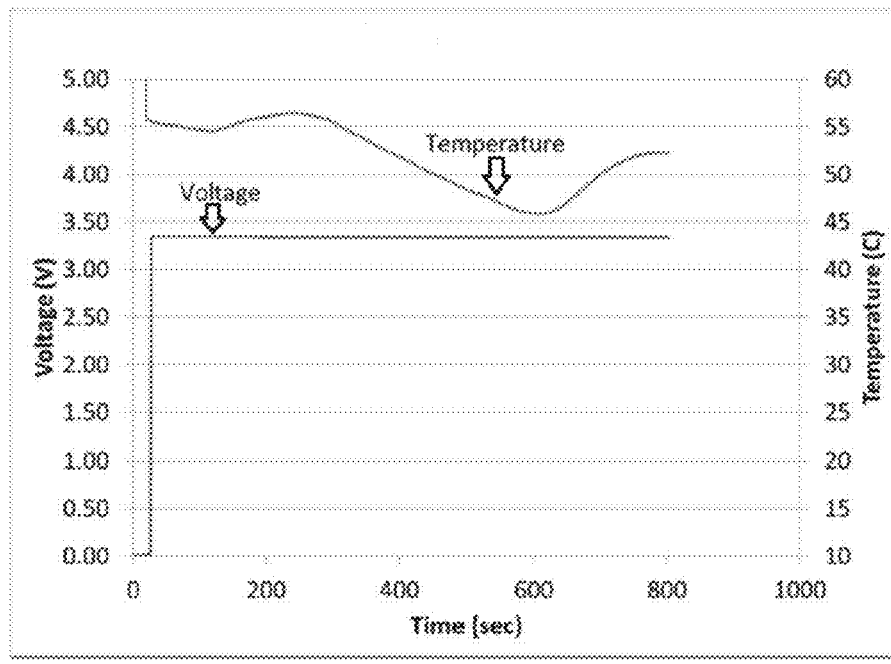
FIG. 23B is a plot of the voltage and temperature of the electrochemical cell of FIG. 23A measured in response to the piercing.

To perform the penetration test, a blunt rod having a diameter of about 3 mm was inserted sequentially into each of the holes of top plate and then penetrated through the Ex. 5 cell disposed between the top plate and the bottom plate. The rod was formed from stainless steel. FIG. 23A shows the Ex. 5a cell penetrated at three locations by the blunt penetration rod. FIG. 23B shows the real time voltage and temperature of the Ex. 5a cell after penetration. No substantial change in voltage was observed and no catastrophic failure of the cell was observed after each of the penetrations. The fluctuations in temperature of the Ex. 5a cell were due to the heating plate disposed below the bottom plate, which was configured to maintain the Ex. 5a cell at the 55 degrees Celsius temperature.

Figure 24A:
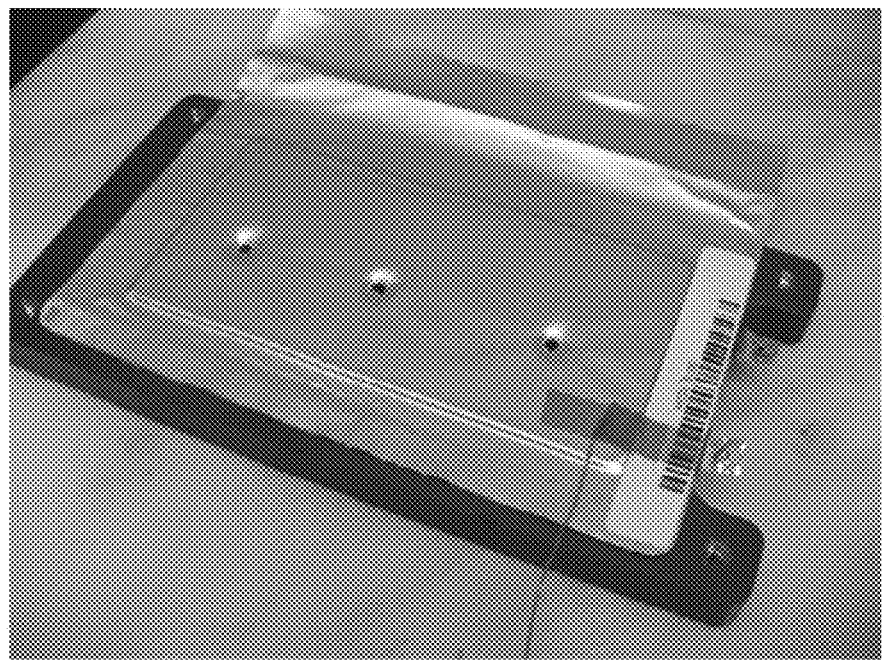
FIG. 24A shows an electrochemical cell pierced at three locations along a longitudinal axis of the electrochemical cell by a blunt piercing rod.
Figure 24B:
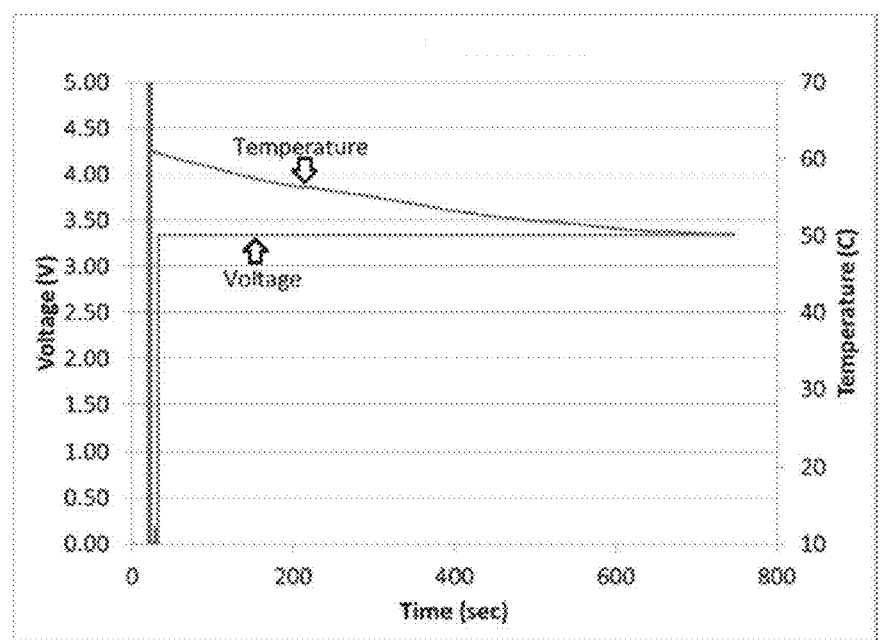
FIG. 24B is a plot of the voltage and temperature of the electrochemical cell of FIG. 24A measured in response to the piercing.
Figure 24C:
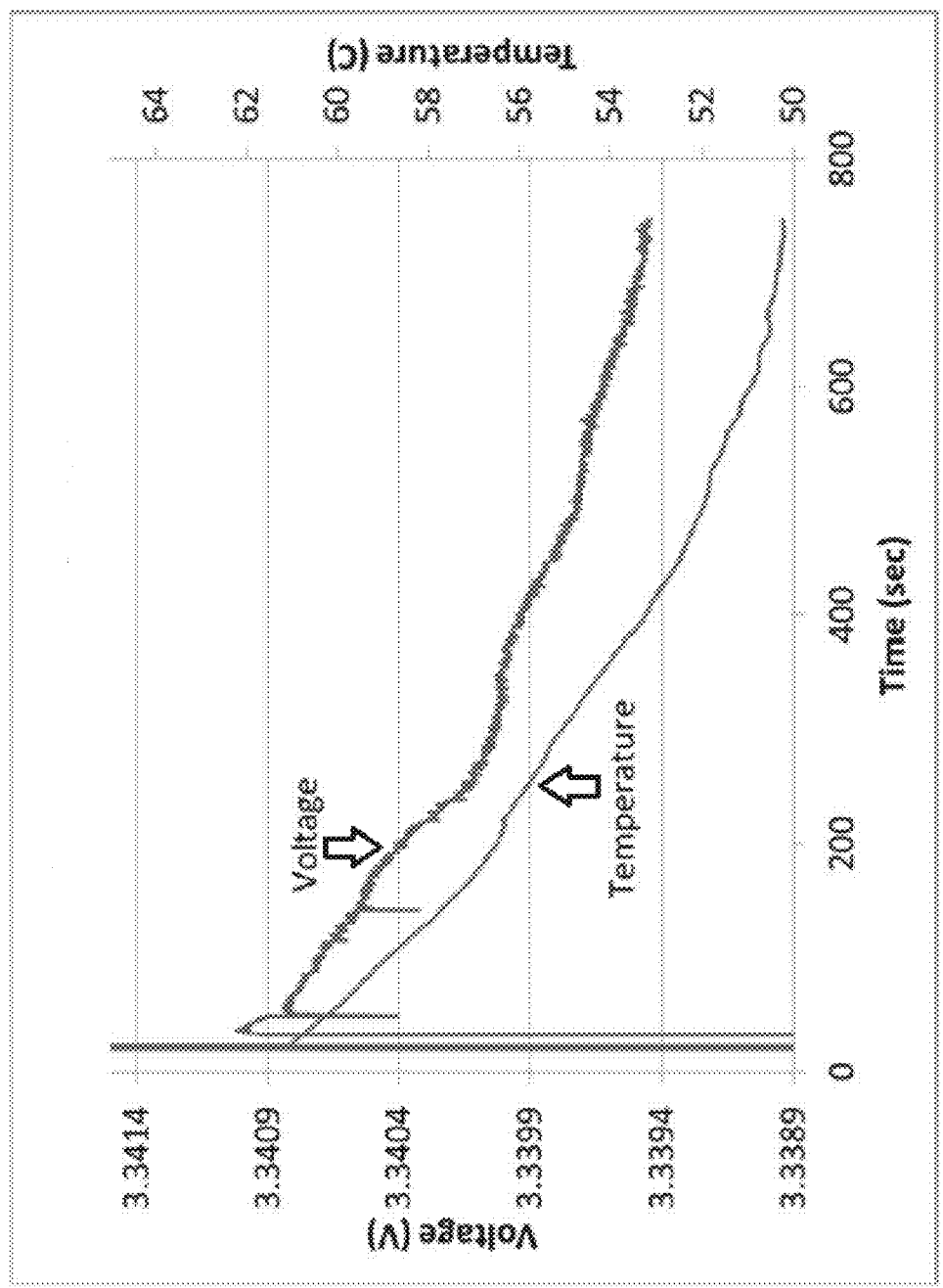
FIG. 24C shows the plot of FIG. 24B with the voltage axis enlarged.

FIG. 24A shows the Ex. 5b cell penetrated at three locations by the blunt penetration rod. FIG. 24B shows the real time voltage and temperature of the Ex. 5b cell after penetration. No substantial change in voltage was observed and no catastrophic failure of the cell was observed after each of the penetrations. FIG. 24C shows the plot of FIG. 24B with the voltage scale enlarged to show that while momentary micro shorts are observed, there was no substantial change in the voltage of the Ex. 5b cell. Furthermore, no catastrophic failure was observed. The fluctuations in temperature of the Ex. 5b cell were due to the heating plate disposed below the bottom plate, which was configured to maintain the Ex. 5b cell at the 55 degrees Celsius temperature.

Figure 25A:
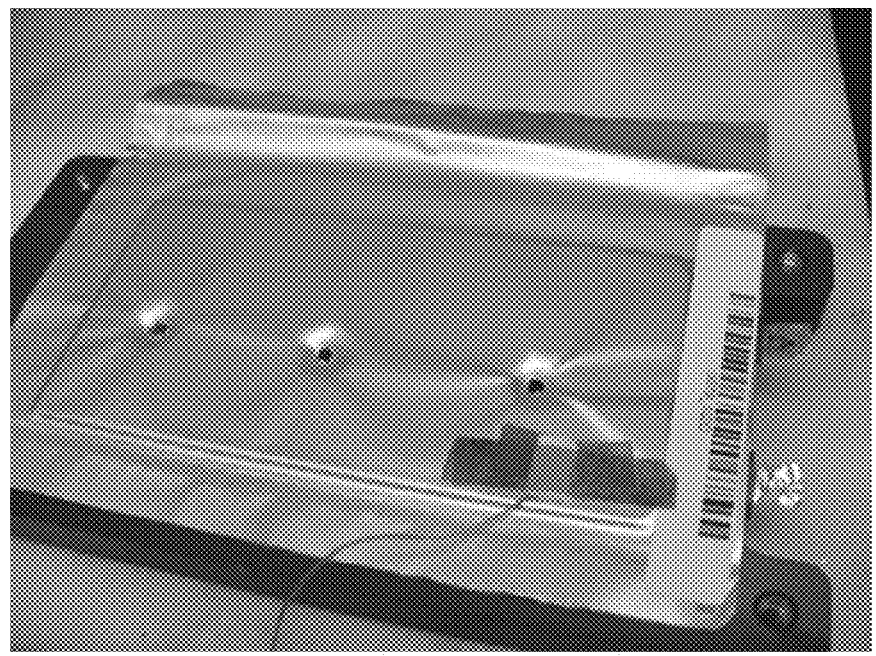
FIG. 25A shows an electrochemical cell pierced at three locations along a longitudinal axis of the electrochemical cell by a blunt piercing rod.
Figure 25B:
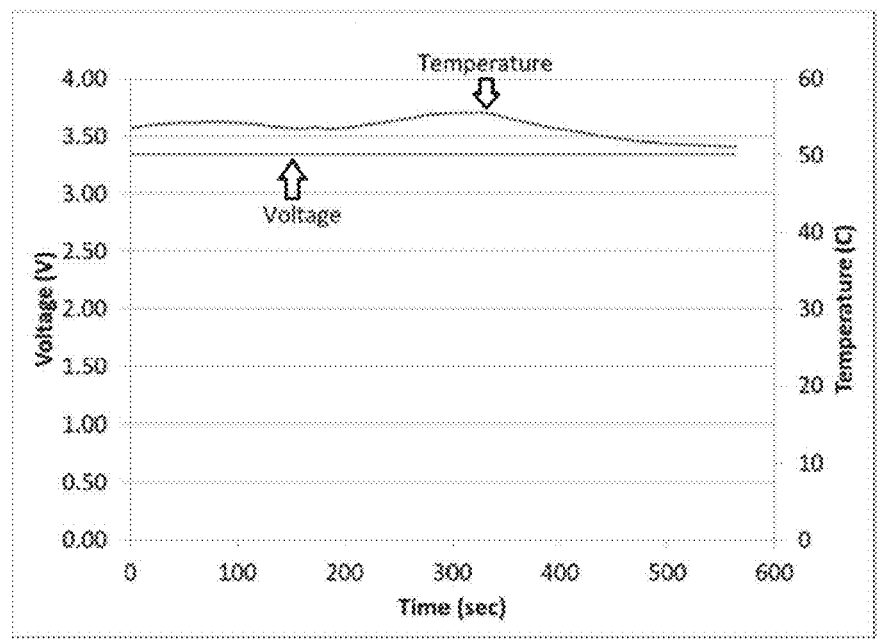
FIG. 25B is a plot of the voltage and temperature of the electrochemical cell of FIG. 25A measured in response to the piercing.
Figure 25C:
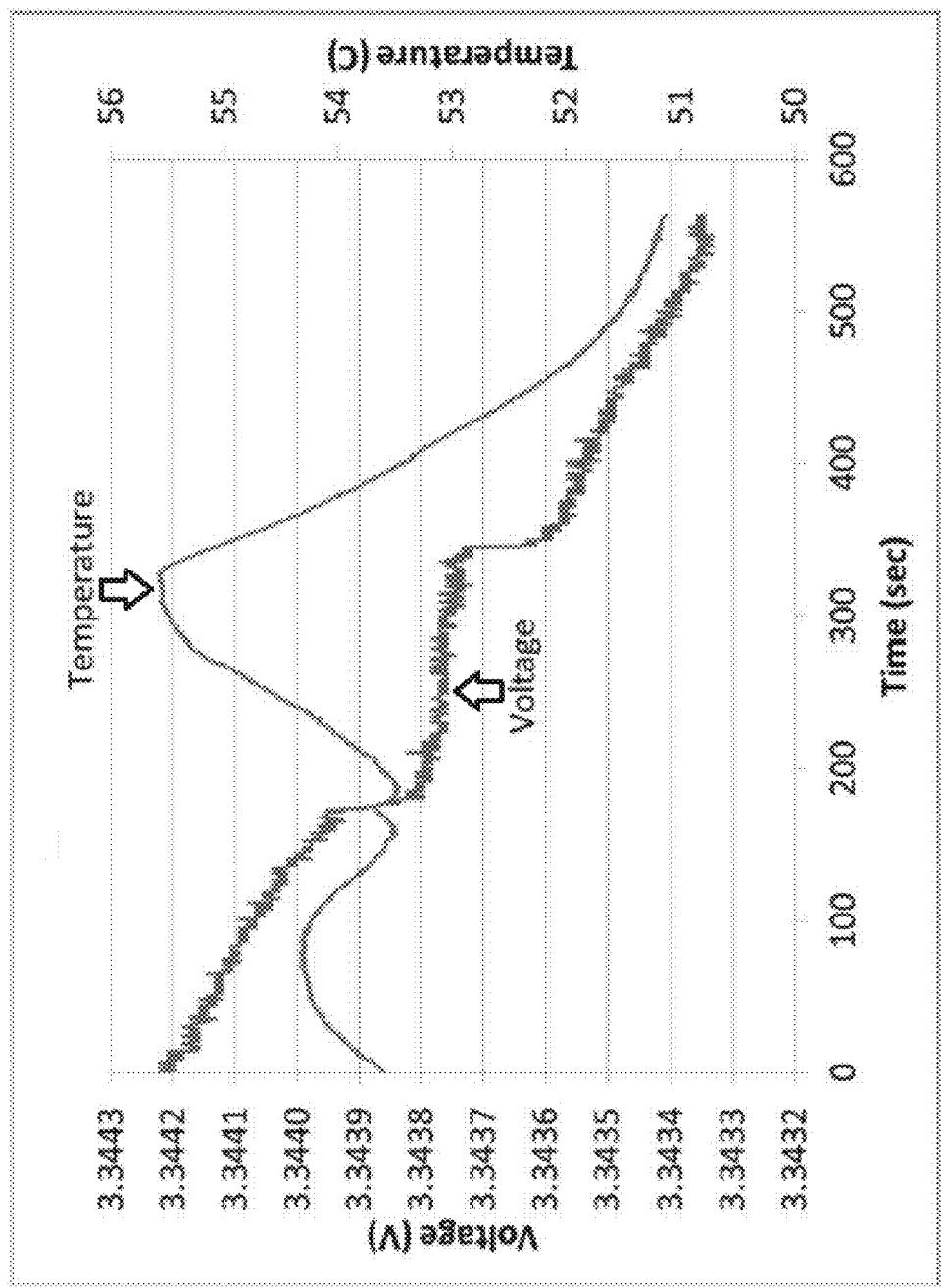
FIG. 25C shows the plot of FIG. 25B with the voltage axis enlarged.

FIG. 25A shows the Ex. 5c cell penetrated at three locations by the blunt penetration rod. FIG. 25B shows the real time voltage and temperature of the Ex. 5c cell after penetration. No substantial change in voltage was observed and no catastrophic failure of the cell was observed after each of the penetrations. FIG. 25C shows the plot of FIG. 25B with the voltage scale enlarged to show that while momentary micro shorts are observed, there was no substantial change in the voltage of the Ex. 5c cell. Furthermore, no catastrophic failure was observed. The fluctuations in temperature of the Ex. 5c cell were due to the heating plate disposed below the bottom plate, which was configured to maintain the Ex. 5c cell at the 55 degrees Celsius temperature.

Figure 26A:
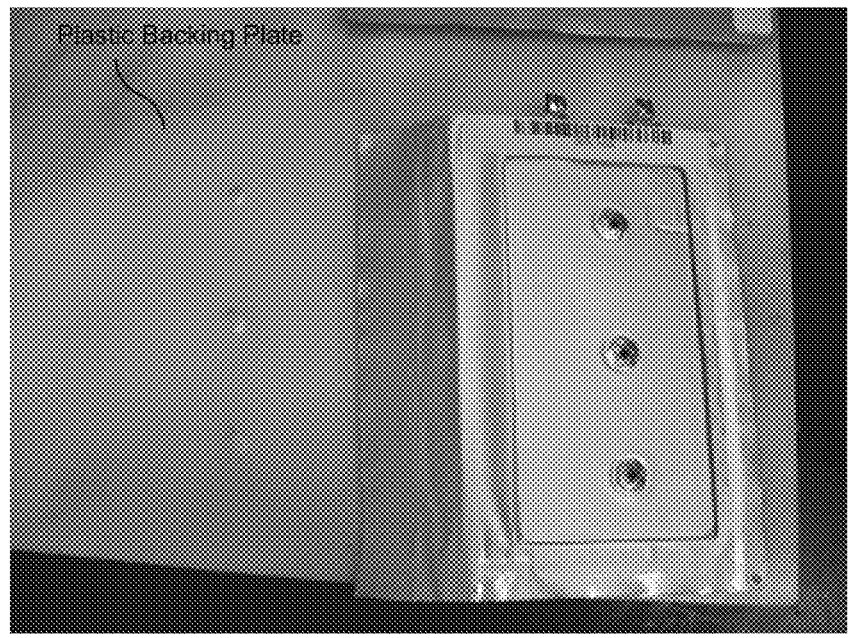
FIG. 26A shows an electrochemical cell pierced at three locations along a longitudinal axis of the electrochemical cell by a blunt piercing rod.
Figure 26B:
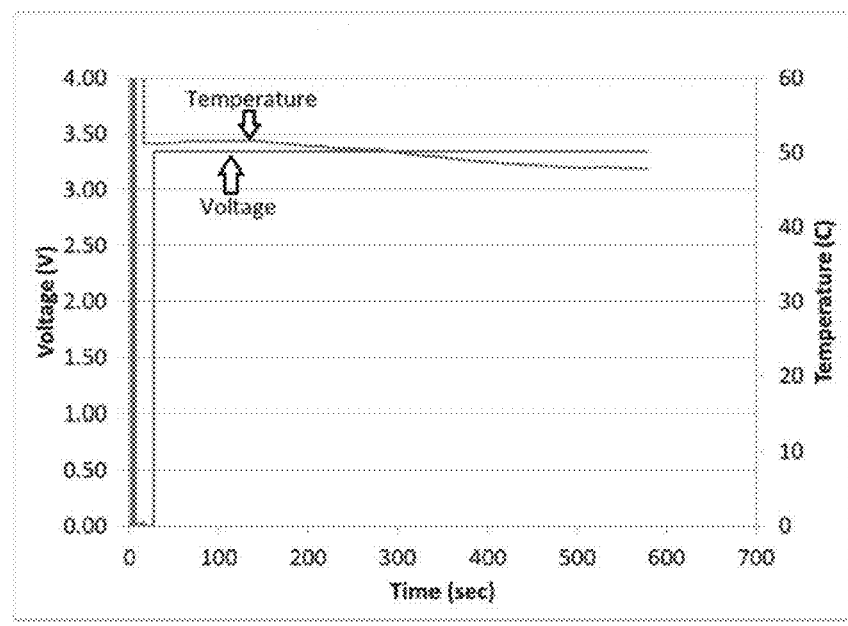
FIG. 26B is a plot of the voltage and temperature of the electrochemical cell of FIG. 26A measured in response to the piercing.
Figure 26C:
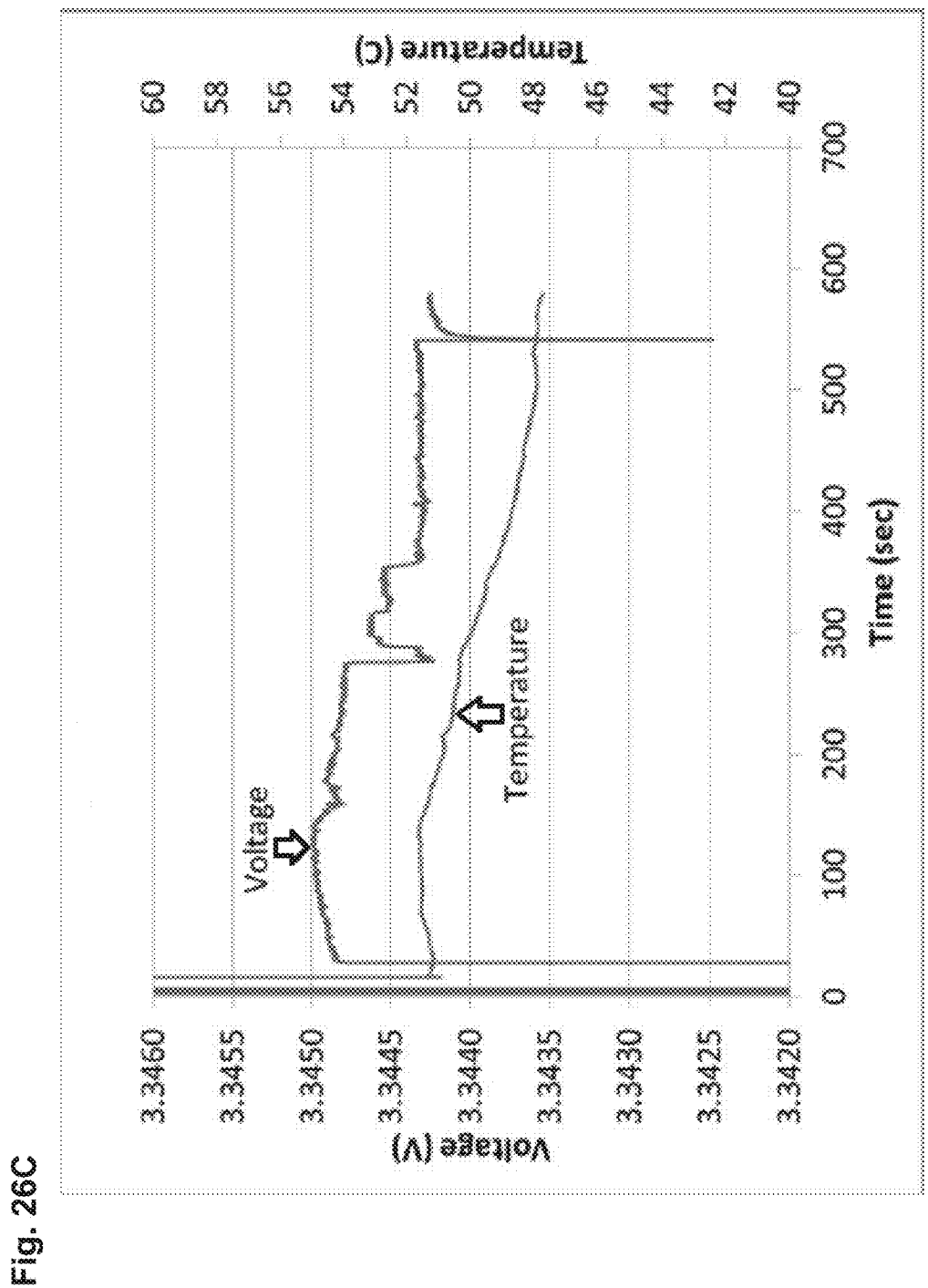
FIG. 26C shows the plot of FIG. 26B with the voltage axis enlarged.

For each of the Ex. 5a, 5b and 5c cells, it was observed that the prismatic pouch material that encloses the electrochemical cells was drawn into the penetration site. It is possible that the drawn in pouch material insulates the penetration rod or drives away the semi-solid electrode material away from the penetration site. To overcome this, a plastic backing plate was disposed beneath the Ex. 5d cell before subjecting the Ex. 5d cell to the penetration test. FIG. 26A shows the Ex. 5d cell penetrated at three locations by the blunt penetration rod. The plastic backing deformed as well by the penetration rod, but rebounded significantly when the penetration rod was retrieved. FIG. 26B shows the real time voltage and temperature of the Ex. 5d cell after penetration. No substantial change in voltage was observed and no catastrophic failure of the cell was observed after each of the penetrations. FIG. 26C shows the plot of FIG. 26B with the voltage scale enlarged to show that while momentary micro shorts are observed, there was no substantial change in the voltage of the Ex. 5d cell. Furthermore, no catastrophic failure was observed. The fluctuations in temperature of the Ex. 5d cell were due to the heating plate disposed below the bottom plate, which was configured to maintain the Ex. 5d cell at the 55 degrees Celsius temperature.

Figure 27A:
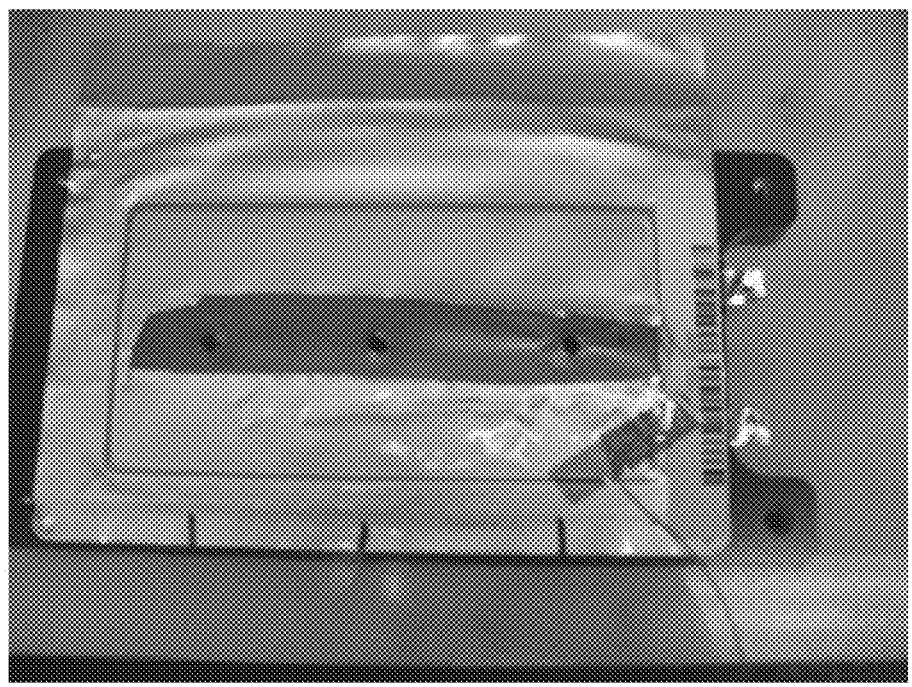
FIG. 27A shows an electrochemical cell pierced at three locations along a longitudinal axis of the electrochemical cell by a blunt piercing rod.
Figure 27B:
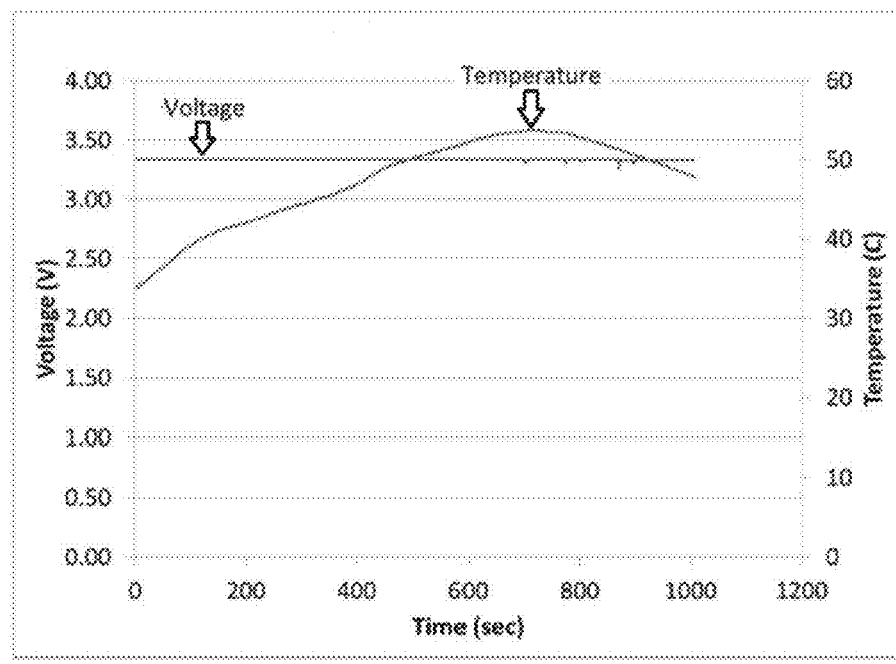
FIG. 27B is a plot of the voltage and temperature of the electrochemical cell of FIG. 27A measured in response to the piercing.
Figure 27C:
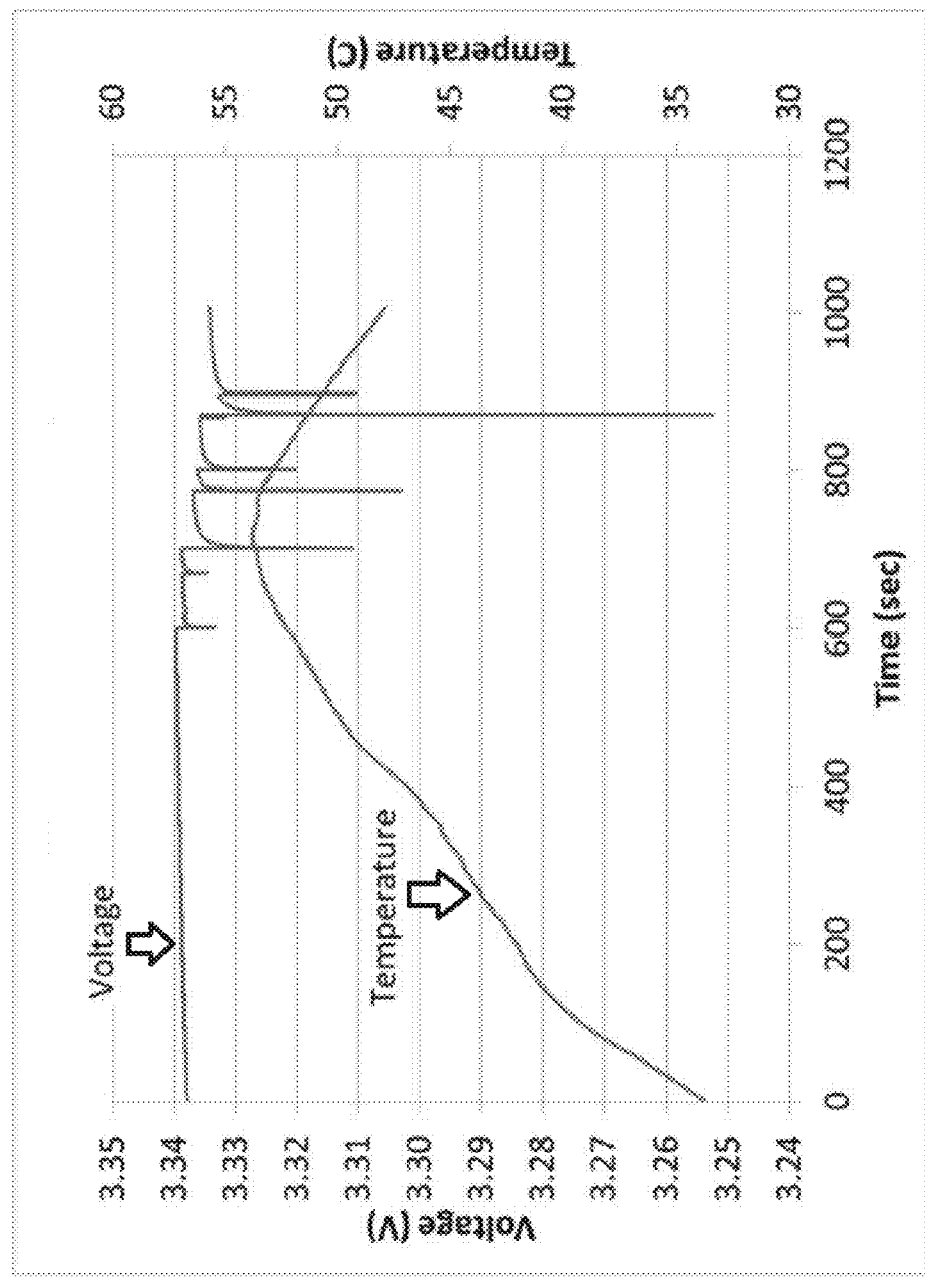
FIG. 27C shows the plot of FIG. 27B with the voltage axis enlarged.

To further ensure that the prismatic pouch laminate material did not protect the electrochemical cell materials from short circuit, a portion of the laminate material of the Ex. 5e cell in the vicinity of the penetration sites was removed before subjecting the Ex. 5e cell to the penetration test. FIG. 27A shows the Ex. 5e cell penetrated at three locations by the blunt penetration rod and the laminate material in the vicinity of the penetration sites removed. FIG. 27B shows the real time voltage and temperature of the Ex. 5e cell after penetration. No substantial change in voltage was observed and no catastrophic failure of the cell was observed after each of the penetrations. FIG. 27C shows the plot of FIG. 27B with the voltage scale enlarged to show that while momentary micro shorts are observed, there was no substantial change in the voltage of the Ex. 5e cell. Furthermore, no catastrophic failure was observed. The fluctuations in temperature of the Ex. 5e cell were due to the heating plate disposed below the bottom plate, which was configured to maintain the Ex. 5e cell at the 55 degrees Celsius temperature.

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
   a positive electrode disposed on a surface of a positive current collector;
   a negative electrode disposed on a surface of a negative current collector; and
   an ion-permeable membrane separating the positive electrode and the negative electrode,
   at least one of the positive electrode and the negative electrode including a semi-solid ion-storing redox composition and having a thickness of at least about 250 µm and unapportioned across substantially all of the surface of the positive current collector or the negative current collector,
   the electrochemical cell having a first operating voltage in a first planar configuration and a second operating voltage in a second non-planar configuration, the second operating voltage being approximately the same as the first operating voltage.

2. The electrochemical cell of claim 1, wherein the semi-solid ion-storing redox composition remains substantially insoluble during operation of the cell.

3. The electrochemical cell of claim 1, wherein the electrochemical cell has a bend axis.

4. The electrochemical cell of claim 3, wherein the electrochemical cell is bent about the bend axis in the second non-planar configuration.

5. The electrochemical cell of claim 1, wherein the electrochemical cell is deformable from the first planar configuration to the second non-planar configuration without mechanical, electrical or thermal failure.

6. An electrochemical cell, comprising:
   a positive electrode disposed on a surface of a positive current collector and defining a single positive electroactive zone;
   a negative electrode disposed on a surface of a negative current collector and defining a single negative electroactive zone; and
   an ion-permeable membrane separating the positive electrode and the negative electrode,
   at least one of the positive electrode and the negative electrode being a semi-solid electrode including a suspension of an ion-storing redox composition in a non-aqueous liquid electrolyte and having a thickness of at least about 250 µm and unapportioned across substantially all of the surface of the positive current collector or the negative current collector,
   wherein an open-circuit voltage of the electrochemical cell is substantially unchanged after a stress event that deforms at least one of the positive electroactive zone and the negative electroactive zone by about 50%.

7. The electrochemical cell of claim 6, wherein the thickness of the semi-solid electrode is reduced by crushing between a flat platen and a textured platen.

8. The electrochemical cell of claim 7, wherein the textured platen includes a plurality of ridges.

9. The electrochemical cell of claim 8, wherein each ridge of the plurality of ridges is semi-circular, has a radius of about 75 mm, and is spaced from at least one adjacent ridge of the plurality of ridges by a spacing of about 30 mm.

10. The electrochemical cell of claim 6, wherein a temperature of the electrochemical cell is substantially unchanged after the thickness of the semi-solid electrode is reduced by about 50%.

11. The electrochemical cell of claim 6, wherein the electrochemical cell is configured to absorb a mechanical force by deforming from a first configuration to a second configuration without mechanical, electrical or thermal failure.

12. An electrochemical cell, comprising:
   a positive electrode disposed on a surface of a positive current collector and defining a single positive electroactive zone;
   a negative electrode disposed on a surface of a negative current collector and defining a single negative electroactive zone; and
   an ion-permeable membrane separating the positive electrode and the negative electrode, at least one of the positive electrode and the negative electrode is a semi-solid electrode including a suspension of an ion-storing redox composition in a non-aqueous liquid electrolyte and having a thickness of at least about 250 μm and unapportioned across substantially all of the surface of the positive current collector or the negative current collector,
   wherein the electrochemical cell is configured to withstand a stress event caused by deforming the electrochemical cell without experiencing thermal runaway.

13. The electrochemical cell of claim 12, wherein the stress event comprises at least one of: (1) deformation of the cell (e.g., physical deformation, such as bending, crushing, etc.); (2) heating to a temperature of great than about 140 degrees Celsius; (3) external short-circuiting; (4) internal short-circuiting; and (5) penetration.

14. The electrochemical cell of claim 12, wherein the electrochemical cell is configured for venting upon heating to a temperature of greater than about 140 degrees Celsius.

15. The electrochemical cell of claim 12, wherein the electrochemical cell is configured to absorb a mechanical force by deforming from a first configuration to a second configuration without mechanical, electrical or thermal failure.

16. The electrochemical cell of claim 12, wherein the electrochemical cell is configured to be externally short-circuited without venting.

17. The electrochemical cell of claim 12, wherein the electrochemical cell is configured to be penetrated without short circuiting.

18. The electrochemical cell of claim 12, wherein the electrochemical cell is configured to be penetrated without venting.

19. The electrochemical cell of claim 12, wherein the electrochemical cell does not experience thermal runaway after the electrochemical cell is heated to temperature of greater than about 150 degrees Celsius.

20. The electrochemical cell of claim 1, wherein the electrode including the semi-solid ion-storing redox composition has a substantially uniform thickness across the surface of the positive current collector or the negative current collector.

21. The electrochemical cell of claim 3, wherein the bend axis can be disposed at any location in the electrochemical cell.

* * * * *